US007076460B2

(12) United States Patent
Dinwoodie

(10) Patent No.: US 7,076,460 B2
(45) Date of Patent: Jul. 11, 2006

(54) INTERACTIVE REMOTE AUCTION BIDDING SYSTEM

(76) Inventor: David L. Dinwoodie, 1909 Skelton St., Flower Mound, TX (US) 75028

( * ) Notice: Subject to any disclaimer, the term of this patent is extended or adjusted under 35 U.S.C. 154(b) by 848 days.

(21) Appl. No.: 10/005,808

(22) Filed: Dec. 3, 2001

(65) Prior Publication Data

US 2002/0082980 A1 Jun. 27, 2002

Related U.S. Application Data

(63) Continuation-in-part of application No. 09/086,877, filed on May 29, 1998.

(51) Int. Cl.
*G06F 17/60* (2006.01)

(52) U.S. Cl. ............... 705/37; 705/1; 705/26; 705/19; 705/35; 705/36; 705/38; 379/283; 379/338; 379/361; 379/457; 379/88.02; 379/900; 379/93.26

(58) Field of Classification Search ............... 705/37, 705/35, 1, 26, 19, 36, 38; 379/283, 338, 379/361, 457, 88.02, 900, 93.26
See application file for complete search history.

(56) References Cited

U.S. PATENT DOCUMENTS

| | | | | |
|---|---|---|---|---|
| 5,339,392 A * | 8/1994 | Risberg et al. | ............. | 715/762 |
| 5,561,707 A | 10/1996 | Katz | ............ | 379/88 |
| 5,740,240 A | 4/1998 | Jolissaint | ............ | 379/265 |
| 5,774,873 A | 6/1998 | Berent et al. | ............ | 705/26 |
| 5,794,219 A | 8/1998 | Brown | ............ | 705/37 |
| 5,815,551 A | 9/1998 | Katz | ............ | 379/88.19 |
| 5,818,914 A | 10/1998 | Fujisaki | ............ | 395/212 |

(Continued)

FOREIGN PATENT DOCUMENTS

| | | |
|---|---|---|
| DE | 43 20 806 | 1/1995 |
| EP | 0900424 B1 * | 3/1997 |

(Continued)

OTHER PUBLICATIONS

Kyle et al, Capital Markets' Assessment of Airline Restructuring Following Deregulation, Oct. 1992, Applied Economics, v24n10,pp.: 1097-1102.*

(Continued)

*Primary Examiner*—John W. Hayes
*Assistant Examiner*—Akiba Robinson-Boyce
(74) *Attorney, Agent, or Firm*—Conley Rose, P.C.

(57) ABSTRACT

An interactive remote auction bidding system for conducting an auction utilizes a data input device for communication over a network to the auction site. The system includes a data processor located at the auction site for generating bid information for communication over the network to the remote locations. A processor located at the auction side monitors the participants' data input devices for sensing participant bids generated by the participants' data input devices. The system further displays visual bid information at the auction site for transmission over the network to the participants and generates audible bid information in support of that visual bid information.

163 Claims, 9 Drawing Sheets

U.S. PATENT DOCUMENTS

| | | | |
|---|---|---|---|
| 5,835,896 A | | 11/1998 | Fujisaki .................... 379/93.12 |
| 5,890,138 A | * | 3/1999 | Godin et al. .................. 705/26 |
| 5,905,975 A | * | 5/1999 | Ausubel ...................... 705/37 |
| 5,953,229 A | * | 9/1999 | Clark et al. ................. 700/100 |
| 6,012,045 A | | 1/2000 | Barzilai et al. ............... 705/37 |
| 6,202,051 B1 | * | 3/2001 | Woolston ..................... 705/27 |
| 6,813,612 B1 | | 11/2004 | Rabenold et al. ............. 705/37 |

FOREIGN PATENT DOCUMENTS

| | | |
|---|---|---|
| FR | 2658635 | 8/1991 |
| NL | 9300266 | 9/1994 |
| WO | WO 9215174 | 9/1992 |
| WO | WO 9737315 | 10/1997 |

OTHER PUBLICATIONS

Patent Abstracts of Japan vol. 097, No. 005 May 30, 1997.

Patent Abstracts of Japan vol. 098, No. 005 Apr. 30, 1998.

Gorda, B. and Wilson, Gregory, "Building and Running Online Auctions," Dr. Dobb's Journal, Oct. 1997, vol. 22, No. 10, pp. 84, 86-88, 91.

* cited by examiner

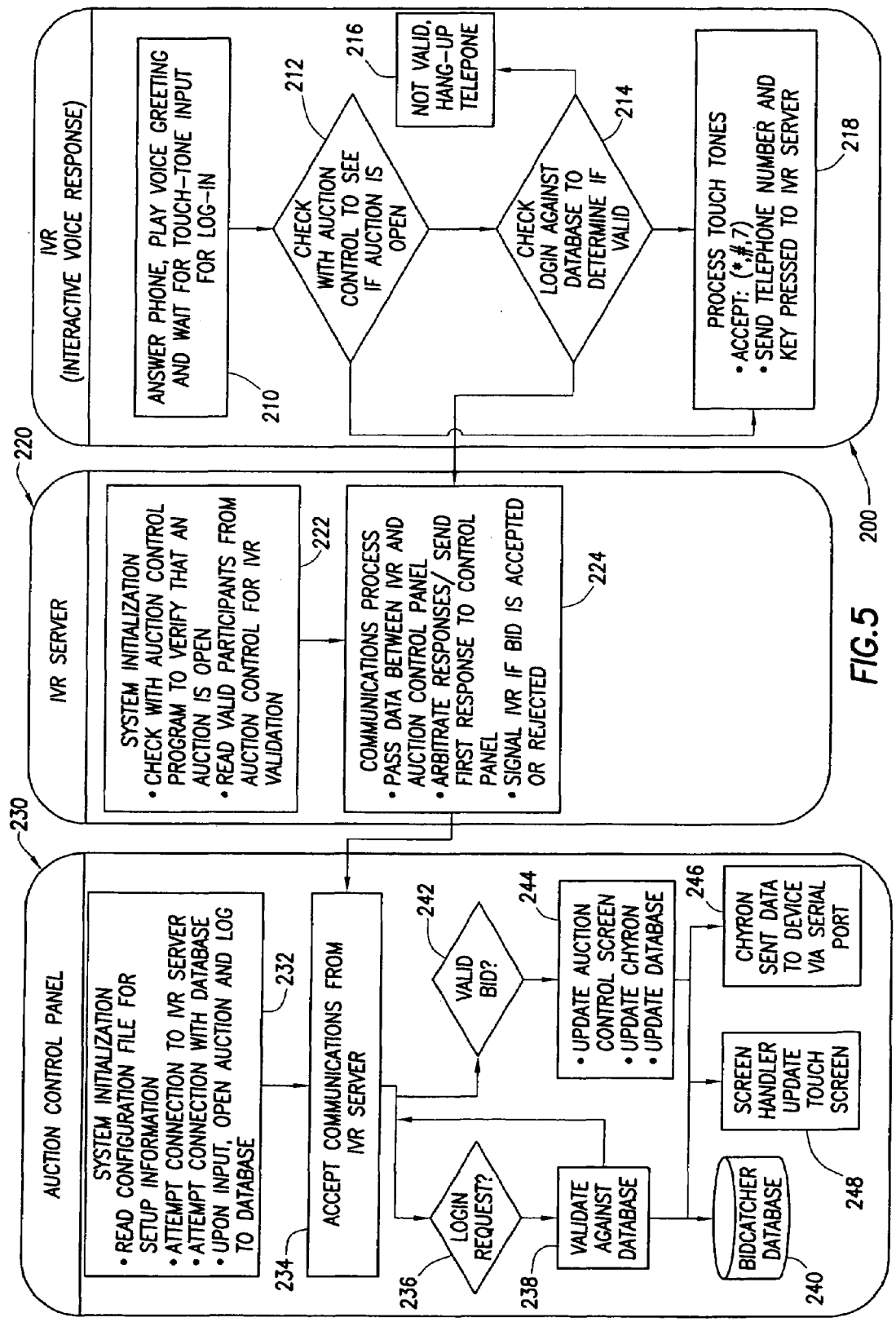

INTERACTIVE REMOTE AUCTION BIDDING SYSTEM

CROSS-REFERENCE TO RELATED APPLICATIONS

The present application is a continuation in part and claims the benefit U.S. patent application, Ser. No. 09/086,877 filed May 29, 1998, entitled "Interactive Remote Auction Bidding System," incorporated herein by reference.

STATEMENT REGARDING FEDERALLYSPONSORED RESEARCH OR DEVELOPMENT

Not Applicable.

TECHNICAL FIELD OF THE INVENTION

The present invention relates to an interactive communications system, and more particularly, to an interactive remote auction bidding system allowing a plurality of bidders to participate in an auction on a real-time basis.

BACKGROUND OF THE INVENTION

Remarketing surplus products is a challenge for manufacturers and dealers in many industries, and in particular the equipment industry. Stale new inventory and "slightly used" product competes for customers with goods direct from the assembly lines. Equipment ownership and usage patterns have changed and continue to change. Whereas most new product was once sold to end users, now many industry segments deliver more than 65% of new product to "Rental/Lease Fleets". Equipment sold is often guaranteed for it's future value. Customers have transferred many elements of ownership risk to manufacturers and dealers by forcing sellers to provide rentals, leases, or future value guarantees. Consumer preference to rent is driven by a composite of factors including tighter lending standards, lack of tax incentives, increasing complexity and specialization of equipment, volatility of equipment values within their industries and increasing availability and competitiveness of short term equipment rental solutions. Rentals, long term leases and "buy back" agreements provide customers use of equipment without the ownership obligations or liabilities. Manufacturers and Dealers remain "at risk" and responsible for rental, lease and "buy back" equipment until it's ultimate sale. In view of these marketing techniques, as well as improvements in the useful life of a product, the burden or remarketing more of these products after their first substantial use remains with manufacturers, dealers and other rental operators. In many cases, the most severe competition for new sales is generated by identical "used product" rather than by new product of competitive manufacturers.

Manufacturers and dealers have achieved success generating sales of new products, but typically have less success remarketing used equipment and transferring ownership obligations to end users. "After market" remarketing specialists such as brokers, traders, import-export entrepreneurs and retail auctioneers provide needed expertise for second and subsequent sales of equipment. These remarketing specialists sell in direct competition to new products sold by dealers and manufacturers.

Due to the diverse demographics of their markets, and fractured communication among dealers, dealers' effectiveness is limited to small geographic areas in proximity to their dealership. Dealers have limited knowledge or success trading outside local trading areas. Manufacturers encourage "local" market focus. Whereas "local" focus for new equipment may be effective, remarketing surplus equipment locally limits potential and is largely an ineffective and costly strategy. At the same time, effort expended, travel costs, language, currency, cultural and information barriers plus lack of critical mass in any single market make venturing beyond local trade areas expensive, risky, inefficient, and often counterproductive for dealers. Accordingly, remarketing used equipment has been inefficient.

Conventionally, auctions of used equipment or the like require that the equipment be brought to the auction site and presented by the seller where the auction takes place. Additionally, all participants to the auction must assemble at the auction site. Such an auction therefore is typically limited to regional geographic areas due to the costs of assembling equipment as well as participants. Scale is crucial to auction success. Scale attracts buyers. The more buyers the better the result. The more specialized the product, the greater the distance both buyer and product must travel for the auction to achieve scale or critical mass. Freight on large equipment is expensive, and moving equipment to an auction site, and then removing the same equipment, if not sold, produces an inefficient non-value added expense. These expenses are further incurred by buyers traveling to auctions.

Similarly, auctions for expensive or unique goods (such as Art or Horses for example) will likewise receive significant benefit from the ability to less expensively bring scale to the auction (they do not have to move all of the goods to the auction site) and/or scale to the number of participants (they do not have to move all of the participants to the auction site). Advantages may be provided by a "real-time" auction information processing system which enables individuals dispersed over a wide geographic area to participate in an auction without gathering at the auction site. Advanatages may also be provided by a system to allow individuals to participate in an auction without requiring a large investment in a technical infrastructure at the buyers'/bidders' remote locations.

SUMMARY OF THE INVENTION

In accordance with the present invention, an interactive remote auction bidding system for conducting an auction among participants some of whom may be located at remote locations from the auction site is provided. Each of the participants at a remote location utilizes a data input device for communication over a network to the auction site. The system includes a data processor located at the auction site for generating bid information for communication over the network to the remote locations. A processor located at the auction site monitors the participants' data input devices for sensing participant bids generated by the participants' data input devices. The system further displays bid information at the auction site for transmission over the network to the participants.

BRIEF DESCRIPTION OF THE DRAWINGS

For a more complete understanding of the present invention and for further advantages thereof, reference is now made to the following Description of the Preferred Embodiments taken in conjunction with the accompanying Drawings in which:

FIG. 5 is a block diagram illustrating one group of components of an embodiment of the present system.

DESCRIPTION OF THE PREFERRED EMBODIMENTS

Figure 1:
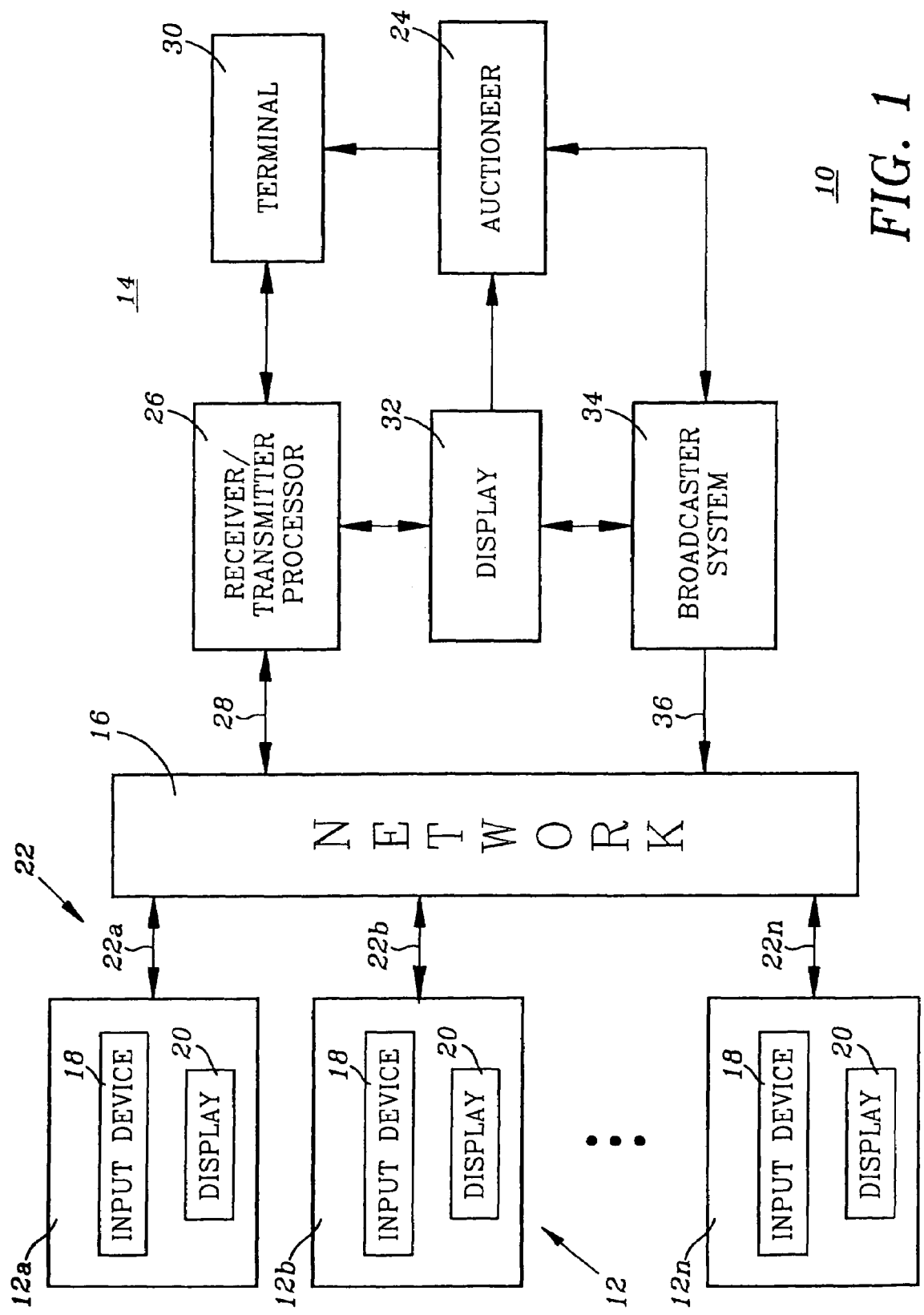
FIG. 1 is a block diagram of the present system.

Referring to FIG. 1, an interactive remote auction bidding system for conducting an auction among participants located at remote locations is illustrated, and is generally identified by the numeral 10. System 10 allows participants located at remote locations 12, 12a, 12b–12n to communicate with an auction site 14 via a communications network 16. Located at each remote site 12 is at least one data input device 18. Data input device 18 may comprise, for example, a conventional Touch Tone® telephone having a key pad which generates dual-tone multi-frequency signals (DTMF). Additionally, data input device 18 may include a cellular telephone, two-way pager, other radio wave transmitter/transponder, or personal computer, for generating bid acceptance data for communication over the network 16 to auction site 14.

Each remote location 12 further includes a display device 20. Display device 20 receives information from auction site 14 via network 16, and may include, for example, a conventional television, a projection television in a theater setting, video telephone conferencing display, or a personal computer display. Communication between remote sites 12 and network 16 takes place over communications links 22, 22a, 22b–22n.

While in the preferred embodiment, remote locations 12 are in geographically distant locations, one of skill in the art will recognize that the described system may have benefits for anybody who does not have direct visual or auditory contact with the auctioneer. Hence, participants in a separate building in the same complex, in a separate room in the same building, or even in the same hall but relying on a display device 20 or data input device 18 to successfully participate could constitute "remote" participants and such buildings, or rooms, or even portions of rooms serviced by such equipment could constitute "remote" locations.

Communications network 16 may include, for example, and is not limited to, a conventional telephone network, cellular network, satellite communications system, cable broadcast system, and television broadcast system. Network 16 may comprise a combination of various types of communications systems for communicating data between remote locations 12 and auction site 14. The configuration of network 16 depends upon the type of equipment used by participants at remote locations 12, and in its simplest form will include a telephone switching network and broadcast television system, and in its most state of the art form, the configuration will include the Internet. In some embodiments, network 16 comprises a network between auction site 14 and input devices 18 comprising a multitude of individual connections (one per input device) with individual exchange of information and a separate broadcast network between auction site and displays at remote locations where the broadcast is uniformly sent out to remote displays.

In its preferred embodiment Auction site 14 comprises a location remote from at least some of the participants at which bids are accepted and the auction is controlled. The auction is controlled by an auctioneer 24 located at auction site 14. Auctioneer 24 functions in a capacity similar to the capacity of an auctioneer in a typical auction where participants are located at the auction site. Equipment to be auctioned at auction site 14 may or may not be physically present at auction site 14. Located at auction site 14 is a receiver/transmitter processor 26 which receives and transmits bid information via network 16 to and from remote locations 12. Receiver/transmitter processor 26 may include, for example, a dual-tone multi-frequency receiver/processor for monitoring DTMF signals generated by input devices 18 at each remote site 12. Additionally, processor 26 may include voice recognition technology for receiving and decoding voice input from input device 18. Processor 28 is capable of identifying and monitoring each input device 18 from a remote site 12 as well as communicating via network 16 with each remote site 12.

Additionally, processor 26 receives initialization parameters, to be subsequently described, for the auction via a terminal 30. Initialization parameters are selected by auctioneer 24 and input to processor 26 via terminal 30. Processor 26 controls a display 32 located at auction site 14. Display 32 displays information such as, for example, the asking bid, current bid, bidder identification, location of bidder, and lot number. Where the auction is conducted across national boundaries, the asking bid and actual bid may be displayed in numerous foreign currency denominations. The information generated by processor 26 and displayed on display 32 is communicated to participants at remote locations 12 via a broadcaster system 34. Broadcaster 34 may include a conventional broadcaster television system whose output is supplied via communications link 36 to network 16. Broadcaster 34 may include a conventional television system, in addition to a satellite communications system, cable network, or the like. Information generated by broadcaster system 34 is displayed on displays 20 at each remote location 12. Broadcaster system 34 may capture a live "picture" of the auctioneer 24 at auction site 14 conducting the auction and may additionally or alternately include pictures and other details of the equipment or lots being auctioned. In this manner, each participant at remote location 12 has the sense of physically being present at auction site 14 during the auction. Broadcaster system 34 further captures information displayed on display 32 for transmission to each remote location 12. In this manner, during the bidding process real-time information is available to each bidder at remote site 12 during the auction.

Figure 2:
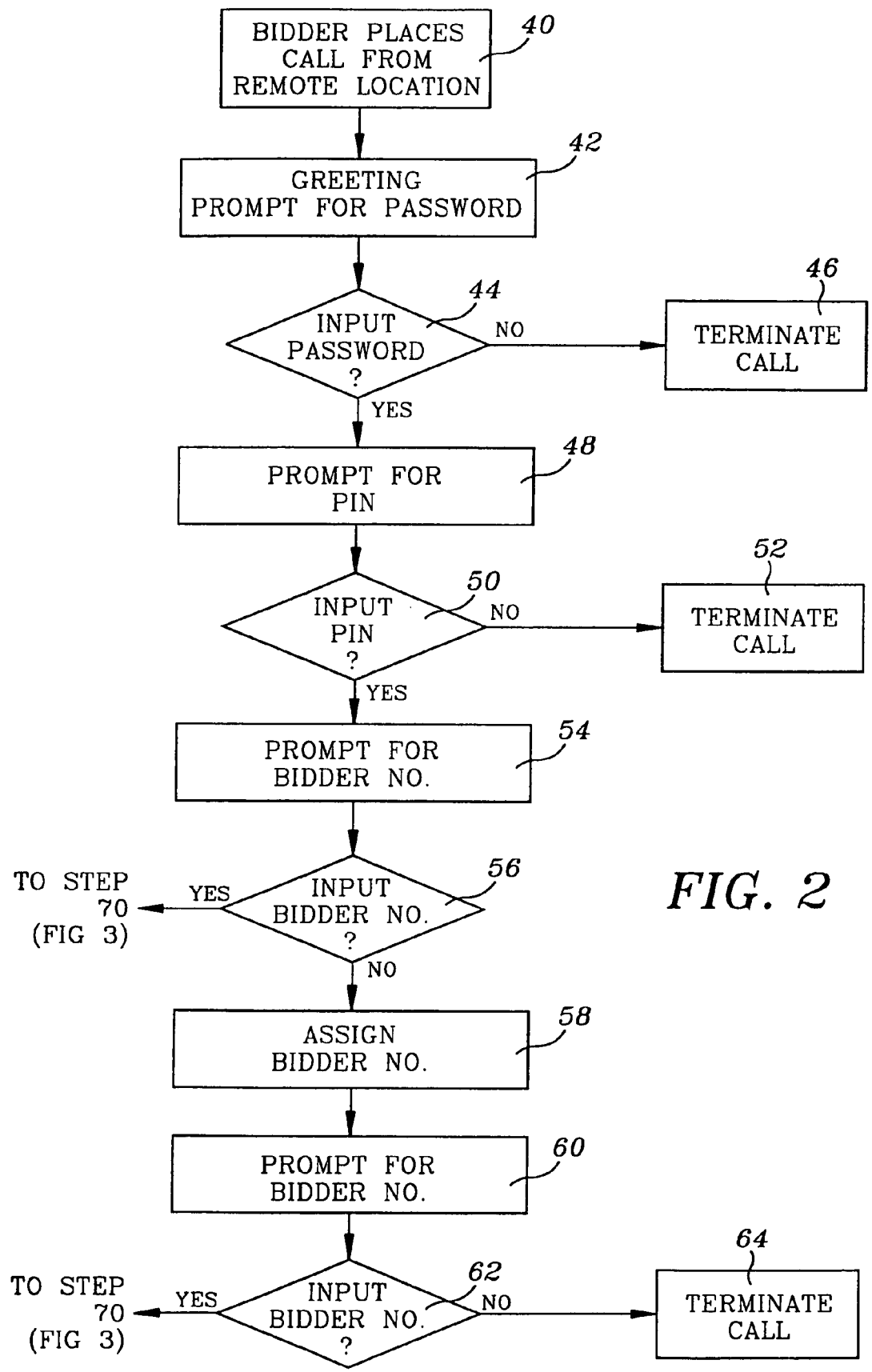
FIGS. 2–4 are flow charts illustrating the overall process of the present system.

Referring now to FIG. 2, prior to commencement of the auction, communications paths are established between each remote location 12 and the auction site 14 via network 16. For example, a bidder at remote location 12a places a telephone call to the auction site 14 using a telephone input device 18. A bidder may call a 1-800 telephone number to auction site 14 at step 40, thereby establishing a communications path via link 22a, network 16, and link 28 to receiver/transmitter processor 26. Acknowledgment of the call to the participant at location 12a is made by processor 26 by generating a greeting to the participant and a prompt for the participant's password at step 42. Upon hearing the prompt, the participant inputs a password utilizing input device 18. A decision is made at step 44 by processor 26 to determine whether the password has been correctly input by the participant. If no password has been input, the telephone call is terminated by processor 26 at step 46. If the proper password has been input and received by processor 26, processor 26 prompts the participant at remote site 12*a* for a personal identification number (PIN) at step 48. The participant then enters the participant's PIN number through input device 18. Processor 26 then determines at step 50 whether a proper PIN number has been received. If no proper PIN number has been received, the telephone call is terminated at step 52. If the PIN number has been received, processor 26 prompts the participant for the participant's bidder number at step 54. Processor 26 then determines whether a proper bidder number has been input by a participant at step 56. If the bidder number has been entered and accepted, the process continues to step 70 (FIG. 3).

If processor 26 determines that no correct bidder number was input from a participant at remote location 12*a*, processor 26 assigns a bidder number to the participant at step 58. Processor 26 then prompts the participant for a bidder number at step 60. The participant then inputs the newly assigned bidder number and processor 26 determines if the bidder number has been input at step 62. If no bidder number has been input, the telephone call is terminated at step 64. If an acceptable bidder number has been input at step 62, the process continues at step 70 (FIG. 3).

At this point, prior to commencement of the auction, each participant at remote locations 12 are linked via network 16 to auction site 14. Processor 26 continuously monitors each input device 18 at remote locations 12 as well as transmits data to each remote location 12 over the established communication links. Prior to commencement of the auction, data such as, for example, sales information, auction messages and instructions, previews of "for sale" assets, and music may be transmitted to each remote location 12.

Figure 3:
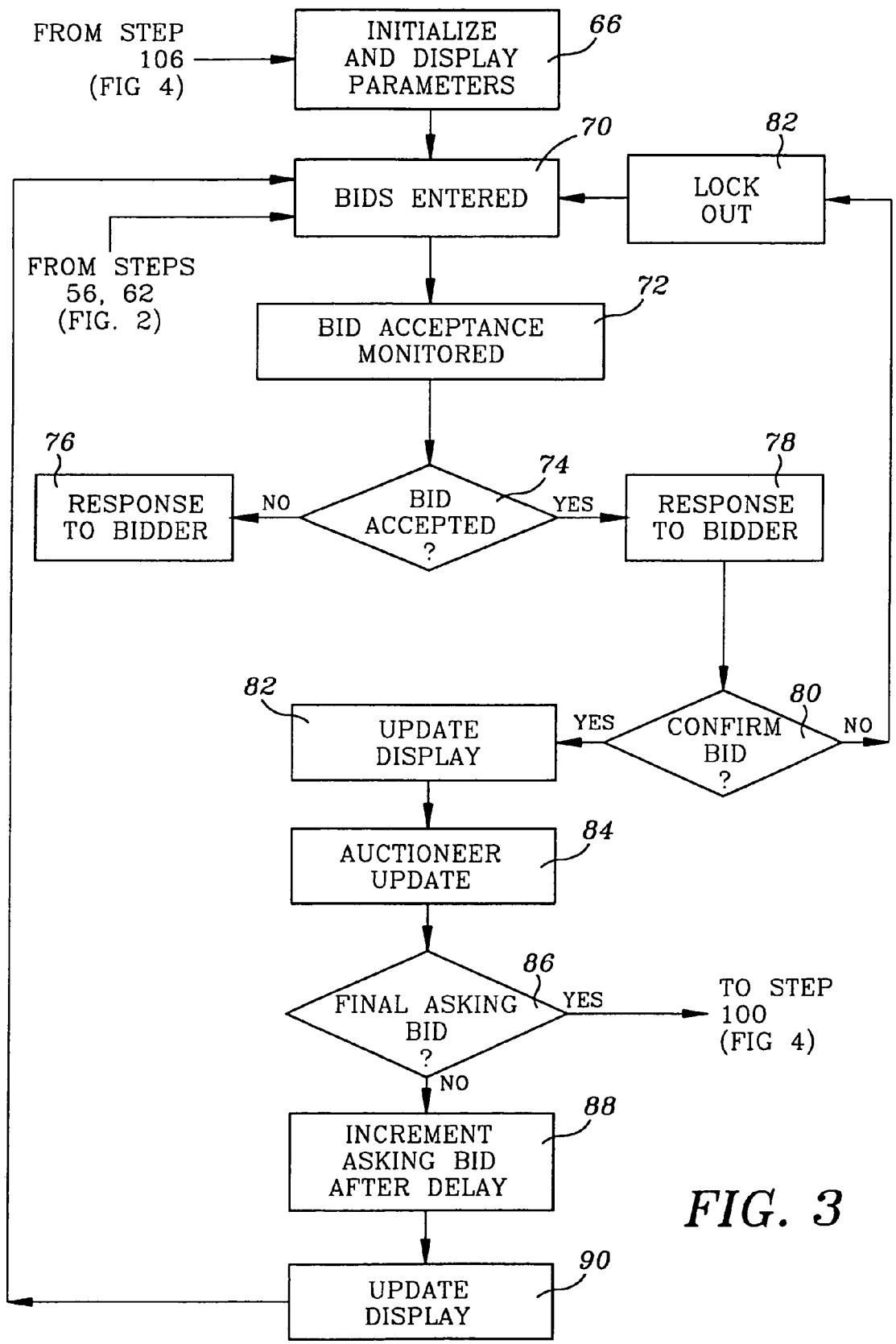

Referring now to FIG. 3, prior to commencement of an auction, various parameters are initialized and displayed at auction site 14 at step 66. Auctioneer 24 via terminal 30 inputs to processor 26 data relating to a lot number, the initial asking bid, a predefined increment, and foreign currency conversion factors for currency denominations for the remote locations participating in the auction. This information is utilized by processor 26 to generate data for display 32. Display 32 in turn provides data to broadcaster system 34 which communicates the information on display 32 via communications link 36, network 16, and communications link 22 to displays 20 at remote locations 12. Therefore, prior to commencement of the auction of each lot, each participant possesses information relating to the lot number, asking bid and its equivalent in any foreign currencies involved in the auction. Throughout the auction, display 32 is updated to reflect actual bids made during the auction (and may further include the amount required to displace the last bid) such that each participant at a remote location 12 participates in real-time at the auction and has current bidding information. The effect of the "real-time" display and participation is that while some minimal communication/calculation delays may be present, participants will be able to effectively interact with and see current information on the auction process as if the participants were actually present at auction site 14.

In an alternative embodiment, broadcaster 34 or an alternative device may in addition to providing audio over the broadcast network may also provide audio of the broadcast back down the component of network 16 connecting to individual input devices 18. In this embodiment, the system delivers audio of the event over what is a telephone line and has it run in background only to be superseded by the IVR system. Accordingly a buyer need not be watching a video broadcast to participate and can conceivably receive his reminder from the IVR system on a cell phone or other phone not in proximity to a video signal. By following the auctioneers chant the buyer may, if he wishes, bid based only on the audio information from the auction. This may be less desirable for bidders as it requires special attention to the auction chant. This audio feedback may be the full audio of the broadcast or may be selected audio from the broadcast conveying critical information. There may also be latency issues, as the latency of the input devices may have a different or much shorter latency than the latency of the broadcast network. In such a case, the sound sent down the network to the input devices may be delayed so that it arrives in the input device at the remote location 12 in sync with the audio from the broadcast. In one embodiment where the broadcast network is a television broadcast over a satellite, the audio can be delayed to have it experience the same latency as the broadcast (level playing field concept) by taking the audio off of a receiver carrying the satellite signal. This technique can help ensure that the same audio information arrives at same time to avoid confusion. Note this inherent latency issue for synchronizing broadcast with another component of the network is distinct from the latency management and the programmed delays before accepting bids discussed later in this disclosure. In an additional alternative, the audio signal may be delivered over the network without latency adjustment whereby it arrives almost instantly by using the auction sound system as the source. This last alternative could be particularly useful where a bidder at the auction site itself wishing to bid by telephone would receive the unadjusted audio, while remote bidders relying on the broadcast receive delayed audio synchronized with the broadcast.

An additional parameter that is initialized is the duration or cycle time during which bids are accepted. This parameter may also be adjusted by auctioneer 24 during the auction. This duration or cycle time parameter affects the amount of controlled or programmed time delay between broadcasting a new asking bid and the system beginning to accept bids at the new price. It creates a bid acceptance window which starts only after the controlled delay has elapsed and ends with the first accepted bid. As discussed immediately above, and in greater detail below, the opening of this window is modifiable by the auctioneer, both before (and in the preferred embodiment during) an individual auction, by varying or adjusting the amount of the controlled time delay.

After initialization of the system, processor 26 begins accepting bids at step 70 from the participants at remote locations 12. Participants at locations 12 generate bid acceptance signals by utilizing input devices 18 such as, for example, by pressing the "#" symbol key on a keypad of a telephone input device 18. Those participants not wishing to enter a bid do not touch any key on the telephone. Where processor 26 includes voice recognition capabilities, a participant may indicate acceptance of a bid by speaking into input device 18 such as "yip". Processor 26 continuously monitors communications link 28 for input bids at step 72.

Processor 26 determines at step 74 whether a bid has been accepted. If a participant's bid has not been accepted, a response is generated to each participant whose bid has not been accepted at step 76. The response may include a predetermined tone generated by transmitter 26 such as, for example, a "honk" sound or the words "Bid not taken, please bid again" communicated to a participant through device 18. If a bid has been accepted, a response is generated to the participant at step 78 such as, for example, by generating a tone at transmitter 26 in the form of a "beep" sound, the sound of a cash register ring, or the words "Bid taken"

indicating to the particular participant at a remote location 12 that the bid has been accepted. In the most preferred embodiment, audible reinforcement of "Bid Taken" is provided to the new high bidder each time bid is captured. In an alternative embodiment an additional feature may provide that the bidder whose bid has just been displaced is advised that he or she is no longer high bidder by issuing an audible "your out" each time his bid is displaced by a higher bid. Both of these audible reinforcements are preferably sent by way of the network to the appropriate corresponding individual input devices 18, although audible tones reflecting that each new bid has been accepted may also be provided over the broadcast network as well. In one alternative embodiment at step 80, a decision is made to determine whether the particular participant at remote location 12 has indeed made the bid by seeking a confirmation. The response to the bidder at step 78 includes a prompt to confirm whether the participant made the bid. The participant may actuate a key on a telephone keypad (such as the "*" key) at input device 18 to confirm the bid. If the bid is not confirmed, a subsequent prompt may be generated to the participant, the participant may be routed to a help desk number, but after a predetermined time, if no confirmation is received, the participant may be locked out of participating in the next bid cycle at step 82. In the preferred embodiment, step 80 may be bypassed to increase the pace on the assumption that the already screened participants are sincere. In this event, in the most preferred embodiment, only the winning bid is confirmed as in step 102 below.

Assuming that confirmation has been received (or alternatively bypassed) from the particular participant that a bid has been made, display 32 is updated at step 82. Display 32 generates the current bid, the location of the bidder, and bidder identification. Auctioneer 24 is also provided with bid acceptance information at step 84. This bid acceptance information may include the generation of an audible prompt (which may be heard by the auctioneer) each time a bid arrives at the auction control panel to prompt auctioneer to move to next increment. At this point in the bidding process of the auction, each participant receives real-time information acknowledging bid receipt and the present status of the auction. All participants in the auction preferably know the location of the bidder, the amount of the accepted bid in the participant's currency value, and the bidder identification number of the accepted bid.

Figure 4:
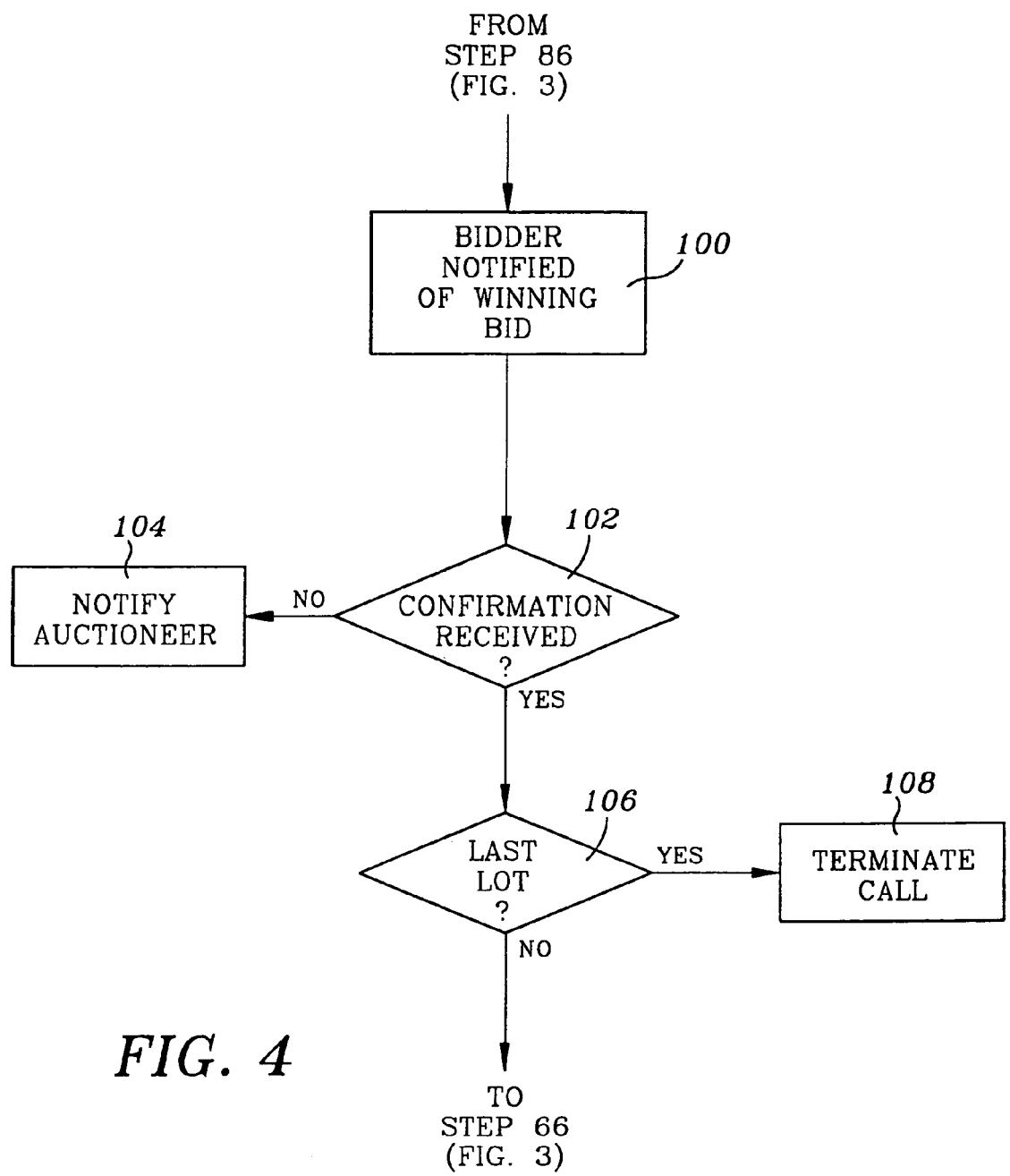

A decision is then made by auctioneer 24 at step 86 as to whether the accepted bid was the final asking bid for the lot. If the decision is yes, the process continues to step 100 (FIG. 4). If the bid is not the final asking bid at step 86, the asking bid is incremented in accordance with the predetermined increments established at initialization at step 66. The asking bid is then incremented and display 32 is updated at step 90. Additionally, the new asking bid can be adjusted in real-time (either by direct input or by adjusting the automatic increments up or down as appropriate) by auctioneer 24 as the bidding approaches the final bid and subsequent close and sale. The new asking bid is subsequently communicated to participants via broadcaster system 34. The asking bid is incremented and a programmed delay (initially the delay may be predetermined by the auctioneer and input as part of the initialization) is incorporated into processor 26 before processor 26 begins accepting subsequent bids from participants at locations 12. In this manner, processor 26 controls subsequent bid acceptances to prevent overrunning of system 10 and establishes a bidding acceptance window of time. The delay is adjustable by auctioneer 24 based upon the particular bidding environment and aggressiveness of participants. After display 32 has been updated with current bidding information, the controlled or programmed time delay elapsed, new bids are then accepted at step 70. The process continues as asking bids are incremented and accepted until the auctioneer determines that the final asking bid has been accepted at step 86, and the process continues to step 100 (FIG. 4).

Auctioneer 24 may provide a warning that the current bid is about to be accepted as the winning bid. The warning may be communicated through audio feedback (such as a drumroll) or video feedback (such as a flashing bid amount or change in color of bid amount) in display 32. Acceptance of the final bid by auctioneer 24 may also generate a real-time response in the display 32 such as a cymbal-crash or visual acceptance signal with the accepted bid amount. With the acceptance of the final bid, the auctioneer blocks or locks out all participants but the winning bidder and proceeds to the confirmation process with the winning bidder.

Referring now to FIG. 4, with the acceptance of the final asking bid the last bidder is notified that the final bid is a winning bid at step 100. Processor 26 notifies the winning bidder and prompts the winning bidder to determine a confirmation at step 102. In one alternative embodiment, the bidder may be forwarded to a help or administration desk to confirm the purchase orally over the phone. At this time a recording could be made which provides backup of the bidder's full intent to purchase. Additionally, at this point, or even on initial login, voice printing of buyers for security could be used in lieu of a password. Telephone based systems allow unique identification of voice prints and the ability to record, verify and use that voice print as absolute confirmation the buyer is who he says he is. If confirmation is not received, a notice is provided to auctioneer 24 at step 104. Auctioneer 24 will then provide subsequent instructions to terminal 30 for communication to the winning bidder.

If confirmation is received at step 102, a decision is made at step 106 to determine if the previous lot was the last lot in the auction. If the decision is yes, the call communication path between remote locations 12 and auction site 14 is terminated at step 108. The auctioneer may also choose to reopen bidding to the entire audience at the level of the previous bid. The confirmation of purchase eliminates doubt that the buyer wanted the item just as holding up a paddle or buyer number or signing a ticket at a live sale does in an auction room. From time to time the high bidder backs out pleading confusion or an error in his understanding of price. When this happens one preferred embodiment of the system provides for an automated backup function which takes the auction back electronically to the last underbidder's bid amount and identity. If there is no more action, then the sale may be completed to the underbidder. If subsequent lots are to be auctioned, the process continues to step 66 (FIG. 3) and new parameters are initialized and displayed for a subsequent lot to be auctioned.

In a preferred embodiment, during the bidding process, processor 26 maintains an audit trail of each participant's response, as well as whether the bid is accepted or not.

FIG. 5 diagrams three components of the network software for the preferred embodiment of the present disclosure, the IVR System 200, the IVR Server 220 (also referred to as the teleserver 220), and the auction control panel 230. In step 210, IVR System 200 answers the phone and asks for a PIN and Password using a phrase such as "Welcome to the BidCatcher Live Auction system. To login, dial your Bidder ID number, then press the pound key." Upon receiving a touch-tone in response to step 210, in step 214, IVR System 200 checks the received touch-tone login against database 240 by way of communications process 224 on IVR Server 220 to communications process 234 on auction control panel 230. If information in step 214 matches the database, then IVR Server 220 accepts the password and so advises the caller. If information does not match it encourages the caller to check for correct entry. If after three tries it does not receive an entry which matches the password it then routes the caller to a live help desk.

Assuming a favorable password is entered in step 214, IVR System 200 then checks to see if an auction is open in step 212. IVR System 200 checks with auction control panel 230 to see if auction is open (connection not shown). If the auction is open, then IVR System 200 hands over the call to IVR Server 220 and establishes direct communication between the caller, IVR Server 220 and the auction control panel 230.

IVR Server 220 has two primary components: initialization process 222 and communications process 224. Initialization process 222 does check database 240 to verify that password and id are valid, it then checks to see whether an auction is open and bidding has been enabled. IVR Server 220 checks ID by communicating with auction control panel 230 by way of communications process 234, auction control panel processes the login request in step 236 and validates against database 240 in step 238. Similarly, the database 240 preferably contains the information on open events which may be searched to see that a requested auction has been enabled.

IVR Server 220 initializes for a given auction in initialization process 222 by checking with auction control panel 230 to verify the open auction and read the valid participants from auction control panel 230 for IVR validation. IVR Server maintains an ongoing communications process 224 which passes data between IVR System 200 and auction control panel 230. Communications process 224 arbitrates responses and sends the responses in order of priority to the auction control panel 230. Communications process 224 on IVR Server 220 similarly responds to each bid request passed through IVR System 200 to signal a response of bid accepted or bid not taken.

Auction control panel 230 initializes for a given auction using initialization process 232, whereby the auction control panel 230 reads a configuration file for setup information, connects with IVR Server 220, and connects with database 240. Based on input through the auction control panel 230's interface, the initialization process opens the auctions and logs to the database. Input through the interface to auction control panel 230 may also set or modify various parameters either before or during the auction as described above and below. Login steps 236 and 238 are as described above. As bids are communicated to communication process 234, auction control panel 230 checks that the bid is valid in step 242. While in the preferred embodiment, auction control panel 230 makes the decision of when the controlled time delay has expired and refuses to accept a valid bid before that time, in an alternative embodiment, IVR Server 220 could be signaled when the bid window has opened and will through its communication process 224 only send the first bid after the delay has expired and the window is opened. Once a valid bid is accepted in step 242, auction control panel, in update process 244, updates the auction control screen using screen handler 248, updates the video graphics generator (such as a video/television graphics generator marketed under the trademark CHYRON) 246 which is producing the broadcast of the auction to monitors at the auction and in remote locations or sites, and updates the database 240. Database 240 may also contain information about the lots and reserves for the lots and other administration for running the auction. Database 240 may be modified by the auctioneer or auctioneer's clerk to make adjustments to this administrative information to account for last minute changes relating to the lots to be auctioned.

Figure 6A:
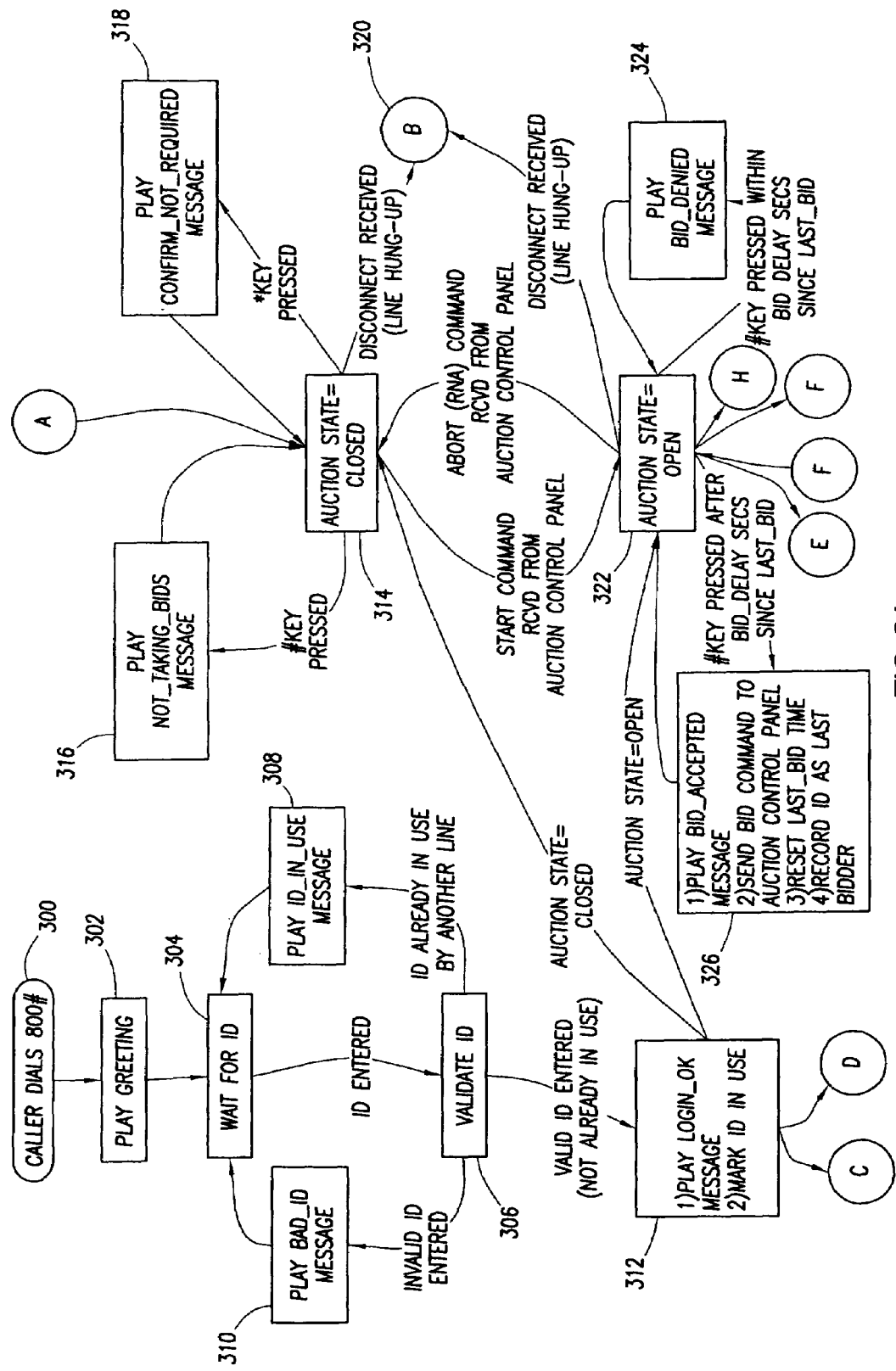
FIG. 6 is a block diagram illustrating the interactions at the phone user interface of an embodiment of the present system.
Figure 6B:
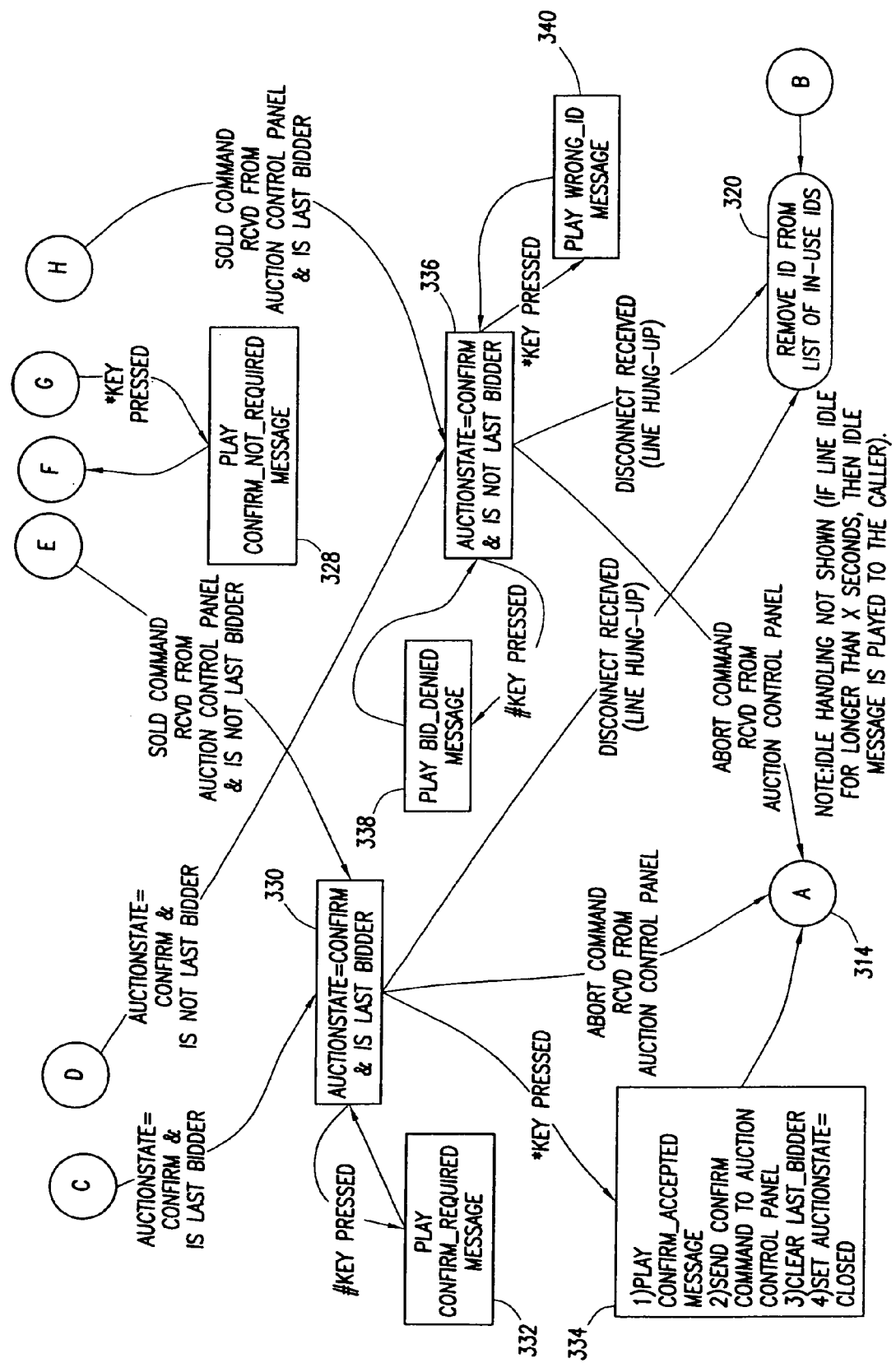

FIG. 6 provides a diagram and flow-path of typical interactions between the bidder on the phone (the caller) and the system of a preferred embodiment of the present system from login through confirmation or disconnect. In step 300, caller dials-in, preferably by dialing a toll-free access number. In response, in step 302, the system plays a greeting back to the caller such as "Welcome to the BidCatcher Live Auction system. To login, dial your Bidder ID number, then press the pound key." After the caller enters an ID, preferably using touch tones but alternatively with voice commands and even with voice identification software for added security interpreted by an IVR component in or working with the system, in step 306 the system validates the ID. If the ID is already in use then in step 308, the system responds to the caller "I'm sorry, but that Bidder ID is already in use" and returns to wait for a different input. If the ID is invalid or not recognized, then in step 310 the system plays a message such as "I'm sorry, but that Bidder ID is not recognized," or "I'm sorry, but I didn't get your entry," possibly followed by "Please refer to the Bidder ID number that was provided to you and dial that number now, then press the pound key." Step 310 then returns to wait for a different input. Although not shown, after a set number of failures, the system in some embodiments may play a message like "I'm sorry you're having trouble. Please contact our help desk at the number shown in your catalog. Goodbye" and then disconnect the caller. Alternatively, after a set number of failures, the system could automatically route the caller to the help desk.

If the ID is validated then in step 312, the system plays a login ok message and marks the ID to be added to a list of in-use ID's. Step 312 also involves checking the state of the auction to be able to properly respond to any inputs from the caller. When no auction is active at all it may play a message like: "There are currently no auctions being held. If you have any questions or you'd like information about the Bid-Catcher Live Auction System or the next auction, please call _____. That number again is _____. Thank you for calling. Good-bye," and then disconnect the system.

If auctions are available the system may play a message like "Thank you! You are now logged into the BidCatcher system. <pause> To bid, press the # key on your telephone keypad. If you are the winning bidder, press the star key when you're asked to confirm your purchase." When a key is activated by the caller, the system then checks or rechecks the auction state. If the auction is closed it moves to state 314. If the # key has been pressed then in step 316 the system may play a message like "Bids are not being accepted at this time. Please wait until we open for bidding on the next lot." The system then returns to the auction state 314. If the star key is pressed, then in step 318 the system plays a message indicating that confirmation is not necessary and returns to auction state 314. Finally, if a disconnect is received (the phone is hung up) then the system goes to step 320 and removes the ID from the list of in-use ids. When the auction is started and the start command received from the auction control panel, the auction state moves to state 322 or the open state.

If the auction is open in state 322 and the star key is pressed, then in step 328 the system plays a message indicating that confirmation is not necessary and returns to auction state 322. If a disconnect is received (the phone is hung up) then the system goes to step 320 and removes the ID from the list of in-use ids. If the # key is pressed the system checks to see if the bid window is open. While illustrated here with the delay before opening the bid window as being the amount of time since the last bid, this is merely another method for accounting for the delay. The preferred method for the delay is the number of seconds since the new asking bid was broadcast. However, since the time from the entry of the last bid and broadcasting of the new bid is virtually instant and does not involve a communication delay (with all of this gap between entry of last bid and broadcasting new bid taking place within the auction control system) defining the time as the delay from the last bid has, as a practical matter, the same effect as defining it as the delay from the broadcast of the new asking bid and for the purposes of this application, the two alternatives will be considered equivalent. Similarly, other minor events in that sequence occurring within the auction control system could also be used as the benchmark for the start of the delay and (with differences in the hundredths of second range or less) will result in equivalent results within the spirit of this disclosure and its claims. In any event, if the # key is pressed within the delay window (the period of controlled time delay time after the broadcast of the new asking bid before the new bid acceptance signals will be accepted) then in step 324 the system will play a message like "Bid not taken." If the # key is pressed after the programmed delay has run and the bid acceptance window has opened, then in step 326 the system will play a message like "Bid accepted", send a bid command to auction control panel 230, reset last time bid, and record the id as last bidder in data base 240.

The cycle of accepting new bids in the auction open state continues and repeats until a sold command is received from auction control panel 230 which moves the state to state 330 if the bidder is the last bidder and to 336 if the bidder is not the last bidder.

If the caller is the last bidder, then the caller alone in state 330 receives the message "You are the winning bidder. Please confirm your purchase by pressing the star key now." If the caller presses the # key then the caller is informed in step 332 that a confirmation is required using the star key. When last bidder hits the "*" key in step 334 the system replies "Congratulations! Your purchase is confirmed." Step 334 continues by sending a confirm command to auction control panel 230, clearing the last bidder from database 240 and changing the auction state to the closed state 314. If an abort command is received from the auction control panel 230, then the system moves to the auction closed state awaiting further instruction from the control panel.

When the sold command is received, bidders who are not the last bidder are moved to state 336. At this state other attempts to bid are rejected in step 338 with a message like "Bids are not being accepted at this time. Please wait until we open for bidding on the next lot." If other than last bidder attempts to confirm with the star key then in step 340 a message is played like "Confirmation is denied because you are not the winning bidder. When asked to confirm your purchase, please press the star key only if you are the winning bidder." If in state 336 a disconnect is received then in step 320 the ID is removed from the list of in-use ID's.

After step 334 occurs the operator of auction control panel 230 changes state to next lot and reopens for bidding moving the system to open state 322.

Figure 7A:
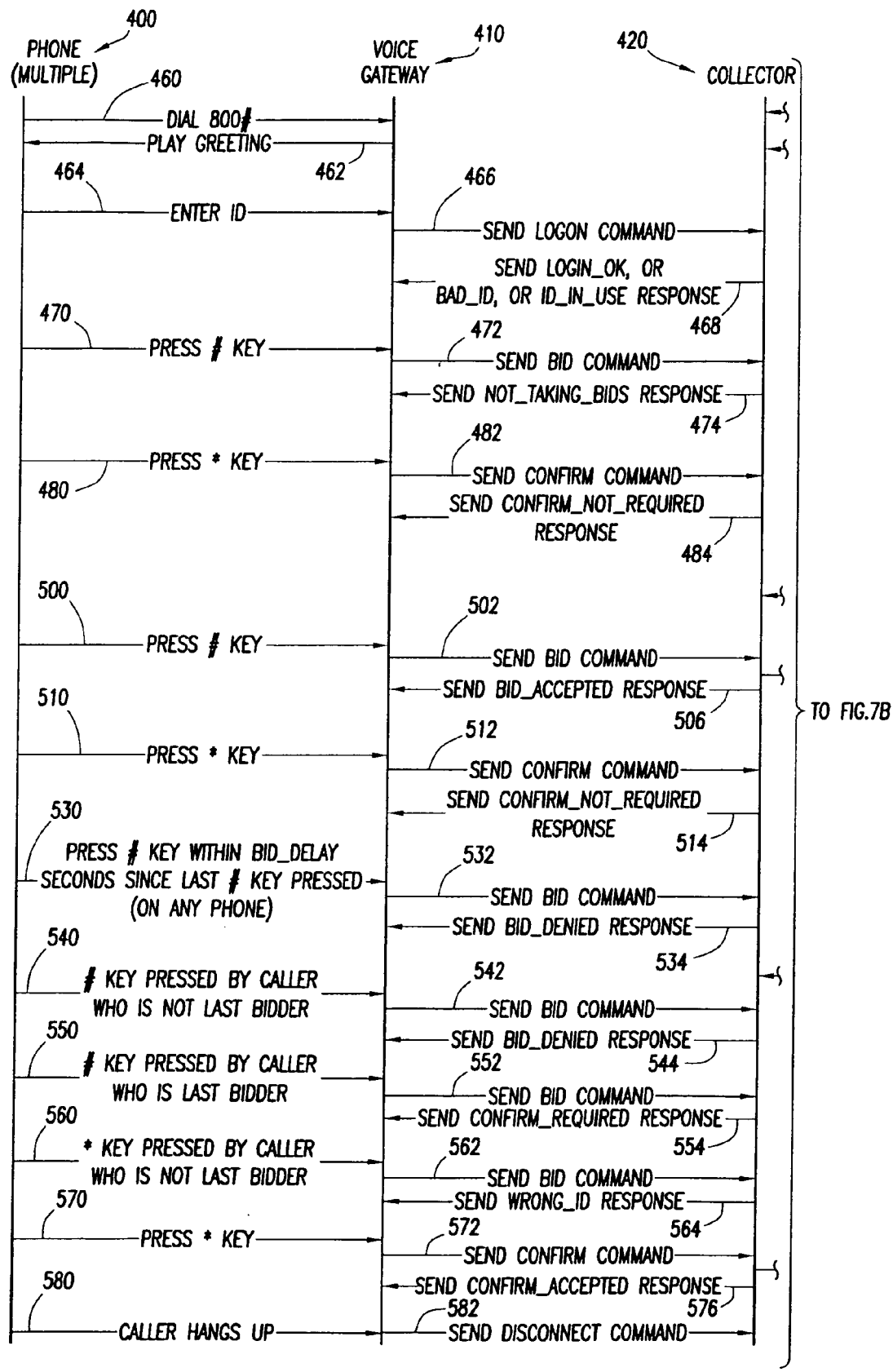
FIG. 7 is an event flow chart of various event interactions in an embodiment of the present system.
Figure 7B:
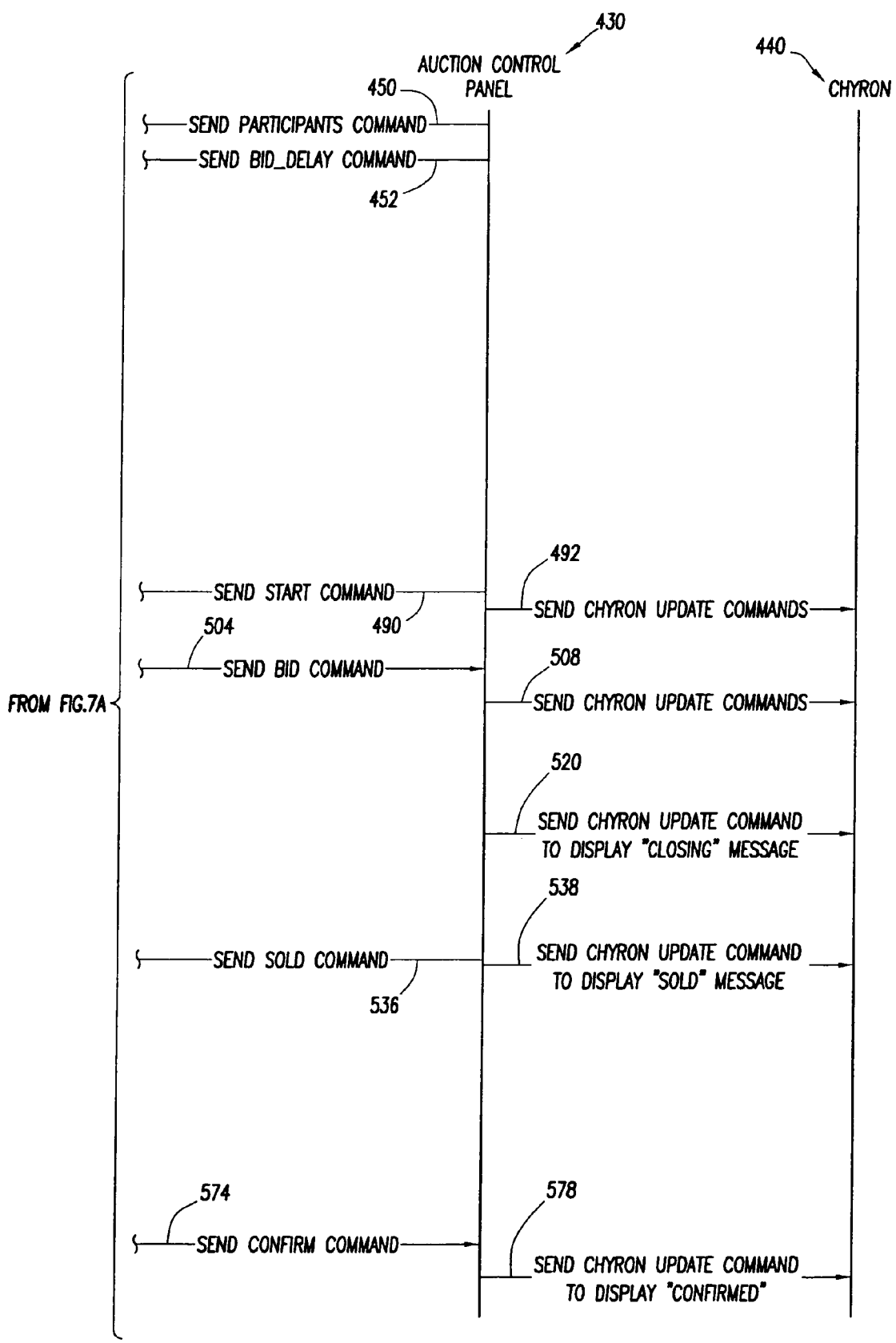

FIG. 7 diagrams several of the possible event flows in an auction run under a preferred embodiment of the present disclosure. The communicating components illustrated include multiple phones 400, voice gateway 410 (also referred to earlier in a slightly different embodiment as IVR System 200), collector 420 (also referred to earlier in a slightly different embodiment as IVR Server 220), auction control panel 430 (also referred to earlier in a slightly different embodiment as auction control panel 230), and video graphics generator 440. While only a single phone 400 is illustrated, in the preferred embodiment a large number of phones 400 will be participating in the auction, each uniquely identified. While only single voice gateways 410 and collectors 420 are illustrated, it is understood that in some embodiments multiple of such components may be present either as back ups or to more efficiently process the substantial number of inputs from phones 400.

FIG. 7 identifies a collection of sequenced events and how the various components interact to develop and maintain the events. These include: initialization in steps 450–452; user login in steps 460–468; the auction start in steps 490–492, close in step 520, and sold in steps 536–538; and various attempts to use one of the key preferred function keys (# or *) during various states in the auction in steps 470–474, steps 480–484, 500–508, 510–514, 530–534, 540–544, 550–554, 560–564, 570–578, and 580–582.

Other alternative functions not illustrated may include a reminder (if idle longer than X seconds the IVR plays reminder). For example, in one embodiment, every 120 seconds the system plays the following to remind caller that system is still alive: "The BidCatcher system remains open for your bids. <pause> To bid, press the # key on your keypad." While only the # and star key are married to bidding responses. The other functions are available for other purposes. In the preferred embodiment the use of the zero key routes caller to a live help desk. This is accomplished manually by touching zero or automatically after three successive failed attempts to register. As discussed above, automatic forwarding could also happen in response to a successful bid to get in-person confirmation (preferably with an audio recording of the conversation) over the telephone by the help desk. Other assistance functions could be attached to other keys such as the "7" key routing to a credit person or the "9" key routing to a transport person.

In one alternative embodiment, the credit of the remote bidders may also be tracked and monitored. On registration to become a bidder, a credit level or limit may be attached to the user id of the bidder. The system could then monitor their bids and total won auctions for that ID and prevent the bidder from bidding beyond their credit limit. The system could also automatically route a telephone call to the live help desk or alternatively a credit desk when the bidder reaches his or her credit limit. Finally, the system could automatically route all buyers to a credit desk after purchase to ensure no unexpected credit difficulties.

In another alternative embodiment, the system may be set to dial-out to a bidder requesting notification when a specific lot is coming up for auction. The system follows the progress of the auction and calls the bidder "x" lot numbers (preferably at least 3 lot numbers ahead, but possibly more depending on the anticipated speed of the auction) prior to the one he has selected. It reminds him he asked for a call, that his desired lot # will sell soon and ask for his password then starts the process at 304. The buyer is bid enabled when he satisfies the system that he is authorized to bid. With this type of automated calling of individual bidders just prior to sale of previously identified lots, they needn't watch the entire broadcast yet can be certain to be "present" when their areas of interest are to be sold.

One minor embellishment in auctions of the type addressed by the present system is the function "choice and privilege or pick and choose". With multiple similar almost identical items the auctioneer groups the like items and then allows the high bidder the privilege but not the obligation to select as many and whichever items in the group and acquire each of them for the same high bid. One embodiment of the present system automates the choice and privilege function by special code fields in the database 240 that enables the system to group certain lots together for sale. Any time choice and privilege applies, the high bidder confirms his high bid in the usual fashion (* key) and is automatically call forwarded to the auction clerk on the auction stand. The clerk asks him for his choices, announces sale of those items, hangs up, and the high bidder returns to his prior status as bid enabled. The auctioneer asks for others who want any of the remainder for same money. The first bidder to hit the # key after the window opens wins the next sale of the remaining items in the group. The *key confirms and they too are routed to clerk for repetition on remaining lots in the group. If no # key is entered, then the auctioneer resells the remaining lots with choice and privilege by restarting the auction cycle for the remaining lots in the choice and privilege group.

Another common embellishment on this type of auction is the presence of a reserve or minimum accepted price for a lot. In a preferred embodiment, the system may accommodate this feature by looking at the database to determine if the seller placed a minimum selling price on the lot after closing the sale but before asking for confirmation and before accepting confirmation. If no minimum exists or if the minimum is below the final bid, then the item proceeds to confirmation and sale. If the minimum or reserve is greater than the highest bid at time of closing, then the system will not allow confirmation and in the preferred embodiment it will display a graphic "RNA" for reserve not attained and will transmit an audio message over the IVR system which says "Reserve Not Attained." The system would then move to a closed state waiting for instruction from the auction control panel.

The disclosure above discusses the ability of the auctioneer or the auctioneer's clerk to dynamically adjust (preferably using touch screen administration on the auction control panel) the opening ask and the opening bid increment and to change the size of the bid increments on the fly and have changes immediately reflected on the auction control panel. In the normal course of an auction the classic auction style is to reduce increments, as fewer bidders remain in the hunt 1000, then 500, then 250, then 100. Also, while the common pattern is to reduce increments, in some hot auctions, particularly with unique difficult to value goods where the movement is less predictable, it may also be desirable to increase the bid increment to accelerate the flow of the auction upwards, so the preferred embodiment of the system provides the ability to increase or decrease the increment. In the normal reduction pattern, a lot priced at 10,000 might call for 11,000, if no answer . . . then 10,500, if no answer then 10,250, and then 10,500 and then 10,750 etc. At some auction houses, they use a different procedure. They drop from 1000 to 500, then to 200 or 300 depending on the last bid. Bidding would go 10,000, 10,200, 10,500, 10,700, and 11,000. One embodiment of the present system has automated this function so that if the 2,5,7 option is selected, when clerk selects the next increment down from 500 hundred (250) the displayed ask is 200 or 500 or 700 or 1000 depending on last bid. This provides a very valuable supplement to auctioneer and is otherwise difficult to impossible to execute manually by clerk. Similarly, other auction houses follow the following bid increment system, increasing in steps from 10 to 25 to 35 to 50 to 60 to 75 to 85 to 100. These increments may also be programmed as an alternative setting made through the auction control panel, again simplifying the maintenance of the auction by the auctioneer and his clerk using the system, while retaining the traditional increments of the auction customer.

While the disclosure above focuses on the remote participants in a live auction, in its most fully realized state, the system will permit the integration of bidders at the auction site, at remote locations in other rooms in the building at the site, and in remote locations geographically disparate from the auction site. In more traditional auctions, the auctioneer leads the auction from the auction room. A collection of bid spotters will be strategically positioned in a large room to assist the auctioneer by spotting bids and calling out on behalf of the bids they spot. The auctioneer may also spot bids personally. In one embodiment of the present invention, bid spotters use their own input devices, preferably radiophones such as 900 Mhz phones or cellular phones, to provide instant capture of the bids they spot by the present system. In this sense, the system enables a level playing field even where remote bidders are not involved, by avoiding the challenges in very large facilities where the auctioneer may miss the first bid in favor of a second because of the direction he or she is looking. Similarly, either with or without the bid spotters having this ability (although preferably with), the auctioneer or the auctioneer's clerk may be provided with a direct link with the system to spot bids on their own and capture them into the described auction system.

A common programming feature preferred in the previously discussed embodiments prevents an individual bidder who logs in from their input device, preferably a telephone (cellular or otherwise), from bidding against themselves by preventing additional bidding from that ID when that ID is the high bidder. To accommodate the use of phones by bid spotters, they are given unique ID's which are permitted to trap multiple bids, where it is then the responsibility of the bid spotter to know which individual's bid he has caught at any one time. The system however, objectively arbitrates which bid spotter was first in with the new bid. In such a manner, the computer may be used as a system to improve auctions even at the auction site itself, in addition to the ability to then relatively seamlessly integrate a series of remote locations into the same process.

In another embodiment of the auction as described above, it may be desirable to allow bidders in the auction room, or even in a remote room using bid spotters to bid anonymously using their cell phones or bid to bid spotters or both (competitive nature of some bidding is such that bidders want to confuse their competitors). In such a case, as discussed with respect to audio through the phones above, the delay of the audio provided to phones of users who are known to the system to be present at the auction site may be chosen to be zero to prevent confusion between the live audio they are hearing and the audio presented through their phones.

Although addressed briefly above, the concept of latency management plays a key role in many of the embodiments of the present system including the most preferred embodiment. Latency management is attained primarily through use of the variable controlled delay time period (or delay window) between the broadcasting of the asking bid and the opening of a window of time during which the system will accept a bid acceptance signal based on that asking bid (bid acceptance window). The delay time period helps solve a problem unique to the technical solution enabling remote bidders to participate in the auction. Since under the present application, only one bid acceptance signal is accepted and identified as the current bid, there is often a race to be the first to accept at the new asking bid. Further, there are latency control problems possible in a computerized system such as the current one because of the rapid speed with which the computer can respond, make updates, and accept new changes, compared with the relatively slow reaction/comprehension speed in humans. Other complicating factors are the various small delays inherent in processing and broadcasting information and receiving information from remote bidders. In a rapidly moving auction, there is the potential for the bids to be escalating so quickly that bidders send a bid acceptance signal to what appears to be one asking bid, but, by the time that asking bid has been displayed to the remote bidder, another acceptance and new asking price have been generated by the auction system so that when acceptance is received, it is interpreted by the system as an acceptance of a later asking bid. This can generate significant bidder frustration and damage buyer confidence and comfort in the environment, the method, and the system. Credibility and trust are key factors in the relationship between auctioneer and buyer and anything which adversely affects auction credibility adversely affects the results of the auction.

A variable controlled delay period (to help manage latency) can help prevent this kind of overrunning of the system, making sure bidders in all locations know what asking bid they are trying to accept. However, at various points in a given auction, the auction may take on a different pace or different technological conditions may make different delay periods desirable (for example, unexpected popularity of an item) to handle these without shutting down the auction and restarting. It is highly advantageous to be able to adjust the delay window during the course of an individual auction of an individual item. The delay window is optimally set in a live setting when there are no complaints that the intended bid is different than the caught bid and on the other hand there are no complaints that the system would not accept my bid even though there was no one else bidding. This optimal setting may change over the course of an auction. The ability to adjust on the fly allows true management of this latency for the environment and events actually occurring.

In the most preferred embodiment there is an integrated bidding system with an absolutely level playing field as to latency and fairness for all participants regardless of their location, technical competence, or sophistication of their equipment or network. In developing and improving the system, analysis of latency has provided the following formula which has proved helpful in anticipating the desired delay time:

LS=Latency Setting

B=Inherent latency of Bid transmittal system (in telephony we are guaranteed no more than 60 milliseconds)

C=Human ability to comprehend and respond to visual/audio information (estimated for the purposes of this formula to vary between 0.05 and 0.30 seconds).

D=Inherent delay in video transmission (varies according to broadcast methods . . . from virtually zero for locally broadcast analog video . . . to approx ¼ second for a non encrypted analog video signal broadcast over satellite . . . to 2 or more seconds for encrypted digital broadcast . . . and who knows for streaming video over the internet?) Accordingly the ideal full comprehension latency setting (which could be used as the initial latency setting) for a given auction environment is LS=B+C+D. This would ideally provide a complete comprehension of the new information being broadcast before allowing any bids to be entered.

An alternative approach to considering the latency settings follows. The principle of latency setting involves certain assumptions and rules. A perfect setting is one where the programmed delay window is just longer than the longest latency for the most latent participant. Accordingly correctly setting the delay requires knowledge of the actual current audience, the method by which each member of that audience receives his information, and the inherent delay experienced by the most latent participant in that audience. Various delivery methods differ in their broadcast latency. Various bid response methods vary in their transmittal latency. Various individuals comprehend and respond to information at different rates (also latency). As a result, the administrator should take all these elements into account in determining the optimal problem free setting. As stated previously, the optimal setting is where the delay window is just longer than the longest latency for the most latent participant. It is conceivable that each individual password (or the information stored in the database associated with that User ID) will also contain data on the latency inherent in that participant and that as each new bidder signs on the setting automatically adjusts to the highest common denominator thus ensuring a perfect setting. In such a case where early participants are all located in the auction room then only human comprehension needs to be accounted for. As more participants sign on who are just analog non-encrypted participants, then the setting adjusts upward slightly to account for them. As more sign on who happen to be analog encrypted, another upward adjustment. Then digital encrypted participants would produce another upward adjustment. Then overseas encrypted participants taking their signal from the digital encrypted US signal would again produce an upward adjustment. As bidders disconnect the system looks for the most latent participant and resets according to the new highest common denominator. As discussed below, this full latency delay would be the setting that is activated as the auction nears conclusion, but may not be the setting employed in the early going which could easily be setting divided by 2 or 3, but never less than enough time for reasonable comprehension. This approach would make the setting dynamic and more probable to be optimal than the manual adjustment by the clerk, yet the clerk has the means to override the dynamic setting by adjusting the "never less than" amount on his control panel.

Typical latencies could fall in the following ranges for the purpose of estimating and anticipating appropriate latency settings under this disclosure:

Human comprehension (never less than)

about 0.1 to 0.3 seconds

For a local analog broadcast virtually nothing other than human comprehension unless there is a manipulated delay such as used by censors For cable local broadcast or direct fiber feed to designated clusters (whether on the continent or even overseas)

virtually nothing other than human comprehension unless there is a manipulated delay such as used by censors For analog non encrypted satellite broadcast about 0.25 seconds plus human comprehension For analog encrypted satellite broadcast about 0.25 seconds plus human comprehension plus time to encrypt (estimated at about 0.25 seconds)

For digital broadcast where fiber feed is direct to digital uplink center about 1.5 seconds to 2 seconds (digital delay such as for an ECHOSTAR satellite) plus delay for fiber feed (almost zero) plus human comprehension.

For digital broadcast where feed to digital uplink center is from an analog satellite (otherwise called a double hop)
about 0.25 seconds for analog hop plus about 1.5 seconds to 2 seconds (digital delay) plus human comprehension For overseas participants who receive their signal from the digital broadcast satellite
the normal digital delay plus the delay imposed by connecting added satellites (estimated from between about 0.25 seconds to 1 seconds per each satellite link depending on the nature of the satellite) plus the delay created by conversion to another video format such as PAL for Europe (estimated at about 0.25 seconds)

For overseas participants who receive their video information via a local satellite whose information is captured directly from an uplink center which is directly connected by fiber to the point of origin of the broadcast
fiber delay (almost non existent) plus digitization and encryption delay if any (about 1.25 to 1.5 seconds) plus one hop (about 0.25 seconds) plus conversion to PAL format (estimated at about 0.25 seconds) plus human comprehension (about 0.25 seconds).

In some rapidly moving auctions the full latency would slow the auction down unacceptably, particularly in the early going when momentum should be building. The implementation of a full delay could damage the pace of an auction. To improve pace, a decision may be made to implement an initial time delay which is short enough that not everyone may always have complete comprehension, but at the lower levels of an auction accidental overbidding is less disturbing to the bidders. Then, as the close or sale approaches and someone may be permanently caught on a missed bid, the delay is moved up to the full amount believed necessary for full comprehension. The system may use several factors as an indicator of the time to initiate full latency. For example full latency may be implemented at a specific prompt by the auctioneer that the auction is winding up, it may be triggered when the increment by which the bids are increasing becomes smaller to a selected level (indicating that there is less activity an the close of the auction is near), or it could be triggered when the time between bids stretches out to a certain distance (again indicating less activity and also indicating that there is less concern with the latency slowing down the pace of the auction). While in the most preferred embodiment discussed above, the latency is manageable by the auctioneer on the fly to tune precisely to the course of the auction; it may also be desirable to build in some automatic latency settings and improvements to reduce the need for on the fly changes.

At present, for embodiments focusing on improving automating latency and adjustments, for initial settings, the preferred initial latency setting (the time delay setting) is between 0.2 and 3.5 seconds, more preferably between 0.3 and 1.5 seconds, and most preferably between 0.5 and 1.0 seconds. For broadcasts involving digital communications by satellite, the preferred final latency settings are between 1.5 and 3.5 seconds, more preferably between 1.75 and 2.25 seconds. While in some circumstances, it is possible to remain at the initial latency setting through out the auction, it is preferred to move from the initial latency setting to the final latency setting near the close of the auction. The most preferred method of making this shift is by timing the delay between bids received. In the most preferred method, when the delay between bids received reaches a certain multiple of the initial latency setting, the system automatically migrates to the final latency setting. The preferred multiple is between about 1 and 3 times the initial latency setting, more preferred is between about 1 and 2 times the initial latency setting, and most preferred is about 1.5 times the initial latency setting.

While in the latency control embodiments discussed above the latency setting is universal for all participants, either local or remote; in an alternative embodiment there may be independent latency control for auction room participants. While applicable generally, this is particularly useful in the embodiments where bid spotters in the sale room are using phones to capture bids and it would be highly undesirable for the bid spotter in the live environment (where accidental overrunning is much less likely without the broadcast delays) to be unable to capture a bid due to the delay time period. Independent adjustment of their latency ensures smooth operation in the auction room. While this may provide a small advantage to participants in the auction room, this is traditionally considered an acceptable benefit for taking the trouble to attend the auction site in person. Similarly, this reduced or eliminated latency could also be provided to bidders who are remote from the main auction room itself but are still located in alternate rooms in the same facility or complex. Their broadcast would not be traveling to satellite so they also are not subject to one of the largest delays which can lead to confusion. Again, it may provide a slight advantage to people who have traveled to the auction venue either in the auction room itself or in alternate rooms which, while remote under the definitions of this disclosure, are still within the grounds of the primary auction site. While in some instances it would be preferable to eliminate latency for these bidders, if the decision is made to independently manage the latency of these bidders a preferred latency would be between 0.1 and 0.5, more preferably between 0.1 and 0.3 seconds to still help reduce overrunning due to human comprehension time and the "inhuman" nature of the system recording and incrementing the new bids.

This disclosure addresses the possible use of phones by bid spotters and/or the auctioneer or even the use of direct connections (which, for example, may be hard-wired or radio remote to a hard-wired connection) by either type of entity (available for example by integrating a mini network) so that those within the auction room are relieved of need to use a telephone as an input device but can do so if they so choose. In either event the auctioneer or bid spotters may capture bids of those in the room into the auction system by use of such direct connections. The use of hard-wired connections or other direct connections not traveling through the phone network could also be singled out for independent latency control or elimination of latency altogether. This could give priority to any bid trapped by auctioneers and bid spotters in the point of origin thus ensuring that buyers present on site have a slight advantage over absent buyers. This will be invisible to virtually anyone but avoids issues of obvious confusion in the live auction room. In summary, independent latency adjustments may be made to the auctioneer and/or the auctioneer's clerk, the bid spotters in the main auction room, the bid spotters in other rooms geographically close but remote from the main auction room, independent bidders present in the main room, or independent bidders in other rooms geographically close but remote from the main auction room. Similarly independent latency adjustments may be made to some combination of these entities or defined groups of these entities as a group.

One other aspect of latency to be considered relates to the ability of bidders on site to have their bids fairly captured by bid spotters using input devices. In this instance, while these bidders would not experience any of the broadcast delays, they face not only delay based on their own reaction time, but also a delay based on the reaction time of the bid spotters to the call or signal of the bidders. This extra delay could place these local bidders at a disadvantage against remote bidders. Since it is typically not acceptable to disadvantage the bidders who have personally attended the auction site, this may also call for some additional latency on the remote bidders to account for the reaction time of the bid spotters, possibly between 0.1 and 0.3 seconds or as otherwise discussed elsewhere in this section. This should actually help level the playing field or err to the side of creating advantage for local bidders rather than the other way around. Further, in some auctions, to maintain the traditional feel, the bid spotters may perform in the traditional manner, with their "analog" yips rather than using the input devices themselves. To accommodate this, a clerk or additional administrator with a keyboard would catch the bid spotters' yips and press the appropriate key to capture them into the system. This adds yet another comprehension delay, the bidder recognizing the new asking bid, the bid spotter recognizing the bidder's signal, and the clerk recognizing and then capturing the bid spotters yip. In these events, another 0.1 to 0.3 seconds should be added to the latency of the remote participants (giving remote participants the longer delay), resulting in anywhere from 0.2 to 0.6 seconds delay, more preferably 0.3 to 0.5 seconds delay. Again, these delays may alternatively be accounted for based on similar accounting for human comprehension elsewhere in the specification.

The use of routers and ISDN lines or other direct point to point connections such as T-1 lines or private networks makes possible the staging of remote auctions where the auctioneer, the bid spotters, and the core audience are in a location different from the studio where the broadcast is produced or alternately where the broadcast originates from a number of locations but the bidding system is stationary and relates to any and all of the locations. In either event, the remote locations receive the same display and still may interact through their input devices. Whereas the typical layout calls for all elements of the broadcast to be in the same room or building, they can be separated by an infinite distance and with proper connectivity used to put the same presentation on to all bidders.

It therefore can be seen that the preferred embodiment of the present remote auction bidding system allows participants at remote locations from the auction site to participate in an interactive manner in an auction. Participants view a real-time video broadcast, via video conference, broadcast television, satellite, cable or Internet transmission and communicate bids utilizing an input device such as, for example, a traditional telephone. The auction is capable of incorporating and receiving bids from remote participants having multi-cultures, language, and currencies. Although more sophisticated communication devices including, for example, two-way pagers, voice recognition systems, and the Internet may be utilized with the present invention, typical telephone devices provide for a simple, low cost, communication vehicle for participating in an auction conducted utilizing the present system. The communications network merely requires a telephone infrastructure which can be based upon, for example, typical long distance telephone lines, cellular systems, and satellite communication systems. The present system is scalable to accommodate unlimited numbers of participants based upon the size of the communications processor utilized at the auction site. Additionally, communications via network 16 may be secured utilizing encryption of data between the auction site and remote locations.

Use of the system described in the present disclosure enables synchronizing of multiple clusters of live bidders geographically spread out all over the world. In some of the fullest embodiments, the system makes live auctions better by integrating absent buyers with live events in one seamless and uniform environment whereby bidders either bid themselves, bid to bid spotter or bid to auctioneer.

Whereas the present invention has been described with respect to specific embodiments thereof, it will be understood that various changes and modifications will be suggested to one skilled in the art and it is intended to encompass such changes and modifications as fall within the scope of the appended claims.

What is claimed:

1. A method for conducting an auction to produce a winning bidder who receives the subject of the auction in exchange for the winning bid, the auction having bidders, where a plurality of bidders have data input devices for communicating over a network to the auction site, comprising:

generating an asking bid;
displaying at the auction site in real-time, the asking bid;
broadcasting in real-time over the network the asking bid to at least one of the plurality of bidders having data input devices;
generating bid acceptance signals representing a desire to acquire the subject of the auction at a current bid by the bidders using the data input devices communicating over the network to the auction site;
delaying a variable controlled time window before accepting a first of a plurality of bid acceptance signals;
monitoring the network for bid acceptance signals;
accepting a first bid acceptance signal after the variable controlled time window;
identifying the bidder whose bid acceptance signal was accepted as the current bidder;
changing the asking bid to the current bid;
adjusting the variable controlled time window before accepting subsequent bid acceptance signals to a second variable controlled time window;
generating a second asking bid;
displaying at the auction site in real-time, a second asking bid and the current bid;
broadcasting in real-time over the network the second asking bid and the current bid to at least one of the plurality of bidders;
delaying the second variable controlled time window before accepting subsequent bid acceptance signals;
monitoring the network for bid acceptance signals;
accepting a first bid acceptance signal after the second variable controlled time window;
identifying the bidder whose bid acceptance signal was accepted as the new current bidder; and
changing the second asking bid to the new current bid.

2. The method of claim 1, further comprising:
repeating a cycle of generating, displaying, broadcasting, generating, delaying, monitoring, accepting, identifying, and changing, at least one additional cycle, each cycle starting with a new asking bid and ending with a new current bid which was the previous new asking bid and new current bidder;
terminating the acceptance of bid acceptance signals before a new bid acceptance signal is communicated over the network to the auction site;

identifying the most recent current bid as the winning bid;
identifying the most recent current bidder as the winning bidder; and
closing the auction.

3. The method of claim 2, farther comprising adjusting the variable controlled time window before accepting bid acceptance signals to a modified variable controlled time window, wherein the adjusting occurs after one time window and prior to the next time window during the auction.

4. The method of claim 3, wherein for at least one cycle during the auction after one time window and prior to the next time window, the time window before accepting bid acceptance signals remains the same.

5. The method of claim 1, wherein generating a second asking bid comprises generating a second asking bid by incrementing the current bid by a predetermined amount.

6. The method of claim 5, further comprising:
repeating a cycle of generating, displaying, broadcasting, generating, delaying, monitoring, accepting, identifying, and changing each time starting with a new asking bid and ending with a new current bid which was the previous new asking bid and a new current bidder at least one additional cycle;
generating an asking bid by incrementing the most recent current bid by a predetermined amount;
displaying at the auction site in real-time, the most recent generated asking bid and the most recent current bid;
broadcasting in real-time over the network the mast recently generated asking bid and the most recent current bid;
delaying the most recent variable controlled time window before accepting bid acceptance signals;
monitoring the network for bid acceptance signals;
terminating the acceptance of bid acceptance signals before a new bid acceptance signal is communicated aver the network to the auction site;
identifying the most recent current bid as the winning bid;
identifying the most recent current bidder as the winning bidder; and
closing the auction.

7. The method of claim 6, further comprising adjusting the predetermined amount to increment the most recent current bid to a modified predetermined amount to increment the most recent current bid, wherein the adjusting occurs after one generation of an asking bid and prior to the next generation of an asking bid during auction.

8. The method of claim 7, wherein for at least one cycle during the auction after one generation of an asking bid and prior to the next generation of an asking bid the predetermined amount to increment the most recent current bid remains the same.

9. The method of claim 1, wherein generating of asking bids comprises generating asking bids in a plurality of currency valuations.

10. The method of claim 1, wherein the data input devices comprise telephones and monitoring the network includes sensing dual tone multi-frequency signals generated by the data input devices.

11. The method of claim 1, wherein broadcasting comprises broadcasting via television network.

12. The method of claim 11, wherein broadcasting via the television network comprises broadcasting via a satellite.

13. The method of claim 11, wherein broadcasting via the television network comprises broadcasting via a cable network.

14. The method of claim 11, wherein broadcasting via the television network comprises broadcasting via conventional television broadcasting.

15. The method of claim 1, wherein the network comprises:
a telephone network selected from the group consisting of a conventional telephone network, cellular network, satellite communications system, and the internet; and
a video network selected form the group consisting of a satellite communications system, cable broadcast system, conventional television broadcast system, and the internet.

16. The method of claim 1, wherein the communication over the network comprises communication of data over the internet.

17. The method of claim 1, wherein displaying and broadcasting further comprise displaying and broadcasting information regarding the most recent current bidder.

18. The method of claim 17, wherein information regarding the most recent current bidder further comprises identifying the location of the most recent current bidder.

19. The method of claim 17, wherein information regarding the most recent current bidder comprises identification of the most recent current bidder.

20. The method of claim 1, wherein the auction site comprises the location of at least one computer participating in running the bidding system.

21. The method of claim 1, wherein the auction site comprises the location of the auctioneer.

22. The method of claim 1, wherein the auction site comprises the location of at least one computer participating in running the bidding system and the location of the auctioneer.

23. The method of claim 22, wherein the at least one computer participating in running the bidding system and the auctioneer are located in the same building.

24. The method of claim 22, wherein the at least one computer participating in running the bidding system and the auctioneer are located in the same complex.

25. The method of claim 22, wherein the auctioneer is located in a different building than the at least one computer participating in running the bidding system and hence wherein the auction site comprises more than one location.

26. The method of claim 1, wherein broadcasting in real-time over the network the asking bid to at least one of the plurality of bidders having data input devices comprises broadcasting in real-time over the network the asking bid to at least one of the plurality of bidders having data input devices located in a remote location from the auction site.

27. The method of claim 26, wherein at least one bidder receiving a broadcast while located in a remote location from the auction site is located in a different city than the auction site.

28. The method of claim 26, wherein at least one bidder receiving a broadcast while located in a remote location from the auction site is located in a different building but in the same complex as the auction site.

29. The method of claim 26, wherein at least one bidder receiving a broadcast while located in a remote location from the auction site is located in a different room but in the same building as the auction site.

30. The method of claim 26, wherein at least one bidder receiving a broadcast while located in a remote location from the auction site is located in the same hail as the auction site but is in a portion of the hail where the bidder is relying on the broadcast and a data input device to successfully participate in the auction.

31. The method of claim 1, wherein broadcasting in real-time over the network the asking bid to at least one of the plurality of bidders having data input devices comprises broadcasting in real-time over the network the asking bid to at least one of the plurality of bidders having data input devices located at the auction site.

32. The method of claim 1, wherein broadcasting in real-time over the network the asking bid to at least one of the plurality of bidders having data input devices comprises broadcasting in real-time over the network the asking bid to at least one of the plurality of bidders having data input devices located in a remote location from the auction site and to at least one of the plurality of bidders having data input devices located at the auction site.

33. The method of claim 1, wherein:
the variable controlled time window is a controlled amount selected from the range of between 0.2 and 3.5 seconds; and
the second variable controlled time window is a controlled amount selected from the range of between 1.5 and 3.5 seconds.

34. The method of claim 1, wherein;
the variable controlled time window is a controlled amount selected from the range of between 0.3 and 1.5 seconds; and
the second variable controlled time window is a controlled amount selected from the range of between 1.75 and 225 seconds.

35. The method of claim 1, wherein:
the variable controlled time window is a controlled amount selected from the range of between 0.5 and 1.0 seconds; and
the second variable controlled time window is a controlled amount selected from the range of between 1.75 and 2.25 seconds.

36. The method of claim 1, further comprising the action of:
measuring the time between one action of accepting a first bid acceptance signal after the variable controlled time window and the next subsequent action of accepting a first bid acceptance signal after the variable controlled time window; wherein
the action of adjusting the variable controlled time window before accepting subsequent bid acceptance signals to a second variable controlled time window;
further comprises adjusting the variable controlled time window before accepting subsequent bid acceptance signals to a second variable controlled time window when the time between subsequent accepting actions reaches a controlled multiple of the time for the variable controlled time window.

37. The method of claim 36, wherein the controlled multiple is selected from the range of between about 1 and 3.

38. The method of claim 36, wherein the controlled multiple is selected from the range of between about 1 and 2.

39. The method of claim 36, wherein the controlled multiple is about 1.5.

40. The method of claim 1, wherein at least one bid spotter acts as a bidder on behalf of a plurality of bidders, generating bid acceptance signals representing a desire to acquire the subject of the auction at a current bid by using the data input devices communicating over the network to the auction site and wherein if a bid spotter is the winning bidder, then the bidder on whose behalf the bid spotter made the winning bid is the bidder who receives the subject of the auction.

41. The method of claim 40, wherein at least one bid spotter and the plurality of bidders on whose behalf the bid spotter is bidding are located at the auction site.

42. The method of claim 40, wherein at least one bid spotter and the plurality of bidders on whose behalf the bid spotter is bidding are located in a remote location from the auction site.

43. The method of claim 42, wherein the remote location from the auction site is located in a different city than the auction site.

44. The method of claim 42, wherein the remote location from the auction site is located in a different building but in the same complex as the auction site.

45. The method of claim 42, wherein the remote location from the auction site is located in a different room but in the same building as the auction site.

46. The method of claim 40, wherein at least one of the plurality of bidders using data input devices is a bid spotter and at least one of the plurality of bidders using data input devices is a bidder acting on their own behalf.

47. The method of claim 40, wherein at least one of the plurality of bidders on whose behalf the bid spotter is acting as a bidder is also independently generating acceptance signals with a data input device.

48. A method for conducting an auction to produce a winning bidder who receives the subject of the auction in exchange for the winning bid, the auction having bidders, where a plurality of the bidders have data input devices for communicating over a first network to the auction site and wherein information from the auction site is broadcast to at least one of the plurality of bidders having data input devices over a second network, comprising:
generating an asking bid;
displaying at the auction site in real-time, the asking bid;
broadcasting in real-time over the second network the asking bid to at least one of the plurality of bidders having data input devices;
generating bid acceptance signals representing a desire to acquire the subject of the auction at a current bid by the bidders using the data input devices communicating over the first network to the auction site;
beginning a bid acceptance time window in which to accept bid acceptance signals after delaying a variable controlled amount of time following broadcasting the asking bid;
monitoring the first network for bid acceptance signals;
accepting a first bid acceptance signal after the bid acceptance time window begins;
terminating the bid acceptance time window after receiving the first bid acceptance signal and prior to receiving any subsequent bid acceptance signals;
identifying the bidder whose bid acceptance signal was accepted as the current bid;
generating a response communicating confirmation of bid acceptance and communicating the response over the first network to the bidder having the current bid;
generating a response communicating bid not accepted and communicating the response over the first network to each bidder who communicates a bid acceptance received after the bid acceptance time window terminated;
changing the asking bid to the current bid;
adjusting the bid acceptance time window before accepting subsequent bid acceptance signals to a modified bid acceptance time window by modifying the variable controlled amount of time delay after broadcasting the asking bid and before beginning the bid acceptance time window;

generating a new asking bid;

displaying at the auction site in real-time, the new asking bid and the current bid;

broadcasting in real-time over the second network the new asking bid and the current bid to at least one of the plurality of bidders having data input devices;

beginning the modified bid acceptance time window after delaying the modified variable controlled amount of time after broadcasting the new asking bid;

monitoring the first network for bid acceptance signals generated by the data input devices communicated over the first network to the auction site;

accepting the first bid acceptance signal after the modified bid acceptance time window begins;

terminating the modified bid acceptance time window after receiving the first bid acceptance signal and prior to receiving any subsequent bid acceptance signals;

identifying the bidder whose bid acceptance was accepted as the current bid;

generating a response communicating confirmation of bid acceptance over the first network to the current bidder;

generating a response communicating bid not accepted and communicating the response over the first network to each bidder who communicates a bid acceptance received after termination of the bid acceptance time window;

identifying the bidder whose bid acceptance was accepted as the new current bid; and changing the new asking bid to the new current bid.

49. The method of claim 48, further comprising:

repeating a cycle of generating, displaying, broadcasting, generating, beginning, monitoring, accepting, terminating, identifying, generating, generating, and changing each cycle starting with a new asking bid and ending with a new current bid which was the previous new asking bid and a new current bidder at least one additional cycle;

terminating the modified bid acceptance time window before a new bid acceptance signal is communicated over the first network to the auction site;

identifying the most recent current bid as the winning bid; identifying the most recent current bidder as the winning bidder; and closing the auction.

50. The method of claim 49, further comprising adjusting the bid acceptance time window before accepting subsequent bid acceptance signals to a modified bid acceptance time window by modifying the variable controlled amount of time to delay after broadcasting the asking bid and before opening die bid acceptance time window, wherein the adjusting occurs after one time window and prior to the next time window during the auction.

51. The method of claim 50, wherein for at least one cycle during the auction after one time window and prior to the next time window the variable controlled amount of time to delay after broadcasting the asking bid and before opening the bid acceptance time window remains the same.

52. The method of claim 48, wherein generating a new asking bid comprises generating a new asking bid by incrementing the current bid by a predetermined amount.

53. The method of claim 52, further comprising:

repeating a cycle of generating, displaying, broad casting, generating, beginning, monitoring, accepting, terminating, identifying, generating, generating, changing each cycle staffing with a new asking bid and ending with a new current bid which was the previous new asking bid and a new current bidder at least one additional cycle;

generating an asking bid by incrementing the most recent current bid by a predetermined amount;

displaying at the auction site in real-time, the most recent generated asking bid and the most recent current bid;

broadcasting in real-time over the second network the most recently generated asking bid and the most recent current bid to bidders;

beginning a bid acceptance time window in which to accept bid acceptance signals after delaying the most recent variable controlled amount of time following broadcasting the asking bid;

monitoring the first network for bid acceptance signals generated by the data input devices communicated over the first network to the auction site;

terminating the acceptance of bid acceptance signals before a new bid acceptance signal is communicated aver the first network to the auction site;

identifying the most recent current bid as the winning bid;

identifying the most recent current bidder as the winning bidder; and closing the auction.

54. The method of claim 53, further comprising adjusting the predetermined amount to increment the mast recent current bid to a modified predetermined amount to increment the most recent current bid, wherein the adjusting occurs after one generation of an asking hid said prior to the next generation of an asking bid during the auction.

55. The method of claim 54, wherein for at least one cycle during the auction after one generation an asking bid and prior to the next generation of an asking bid the predetermined amount to increment the most recent current bid remains the same.

56. The method of claim 49, wherein between terminating the modified bid acceptance time window before a new bid acceptance signal is communicated over the first network to the auction site, and closing the auction the method further comprises:

generating a prompt to the winning bidder over the first network seeking confirmation of the winning bid; and receiving confirmation from the winning bidder aver the first network.

57. The method of claim 53, wherein between terminating the modified bid acceptance time window before a new bid acceptance signal is communicated over the first network to the auction site, and closing the auction the method further comprises:

generating a prompt to the winning bidder over the first network seeking confirmation of the winning bid; and receiving confirmation from the winning bidder generated by the data input devices communicated over the first network.

58. The method of claim 48, wherein the first network and the second network collectively comprise a combination of types of communications systems for communicating between bidders and the auction site.

59. The method of claim 48, wherein the first network comprises:

a telephone network selected from the group consisting of conventional telephone network, cellular network, satellite communications system, and the internet.

60. The method of claim 48, wherein the second network comprises:

a video network selected from the group consisting of satellite communications system, cable broadcast system, conventional television broadcast system, and the internet.

61. The method of claim 48, wherein the auction site comprises the location of at least one computer participating in running the bidding system.

62. The method of claim 48, wherein the auction site comprises the location of the auctioneer.

63. The meted of claim 48, wherein the auction site comprises the location of at least one computer participating in running the bidding system and the location of the auctioneer.

64. The method of claim 63, wherein the at least one computer participating in running the bidding system and the auctioneer are located in the same building.

65. The method of claim 63, wherein the at least one computer participating in running the bidding system and the auctioneer are located in the same complex.

66. The method of claim 63, wherein the auctioneer is located in a different building than the at least one computer participating in running the bidding system and hence wherein the auction site comprises more than one location.

67. The method of claim 48, wherein broadcasting in real-time over the network the asking bid to at least one of the plurality of bidders having data input devices comprises broadcasting in real-time over the network the asking bid to at least one of the plurality of bidders having data input devices located in a remote location from the auction site.

68. The method of claim 67, wherein at least one bidder receiving a broadcast while located in a remote location from the auction site is located in a different city than the auction site.

69. The method of claim 67, wherein at least one bidder receiving a broadcast while located in a remote location from the auction site is located in a different building but in the same complex as the auction site.

70. The method of claim 67, wherein at least one bidder receiving a broadcast while located in a remote location from the auction site is located in a different room but in the same building as the auction site.

71. The method of claim 67, wherein at least one bidder receiving a broadcast while located in a remote location from the auction site is located in the same hail as the auction site but is in a portion of the hail where the bidder is relying on the broadcast and a data input device to successfully participate in the auction.

72. The method of claim 48, wherein broadcasting in real-time over the network the asking bid to at least one of the plurality of bidders having data input devices comprises broadcasting in real-time over the network the asking bid to at least one of the plurality of bidders having data input devices located at the auction site.

73. The method of claim 48, wherein broadcasting in real-time over the network the asking bid to at least one of the plurality of bidders having data input devices comprises broadcasting in real-time over the network the asking bid to at least one of the plurality of bidders having data input devices located in a remote location from the auction site and to at least one of the plurality of bidders having data input devices located at the auction site.

74. The method of claim 48, wherein:
the controlled amount of time for delay following broadcasting the asking bid is a controlled amount selected from the range of between 0.2 and 3.5 seconds; and
the modified controlled amount of time for delay following broadcasting the asking bid is a controlled amount selected from the range of between 1.5 and 3.5 seconds.

75. The method of claim 48, wherein:
the controlled amount of time for delay following broadcasting the asking bid is a controlled amount selected from the range of between 0.3 and 1.5 seconds; and
the modified controlled amount of time for delay following broadcasting the asking bid is a controlled amount selected from the range of between 1.75 and 2.25 seconds.

76. The method of claim 48, wherein:
the controlled amount of time for delay following broadcasting the asking bid is a controlled amount selected from the range of between 0.5 and 1.0 seconds; and
the modified controlled amount of time for delay following broadcasting the asking bid is a controlled amount selected from the range of between 1.75 and 2.25 seconds.

77. The method of claim 48, further comprising the action of:
measuring the time between one action of accepting a first bid acceptance signal beginning a bid acceptance time window and the next subsequent action of accepting a first bid acceptance signal after beginning a bid acceptance time window; wherein
the action of adjusting the bid acceptance time window before accepting subsequent bid acceptance signals to a modified bid acceptance time window by modifying the variable controlled amount of time delay after broadcasting the asking bid and before beginning the bid acceptance time window; further comprises adjusting the adjusting the bid acceptance time window when the time between subsequent accepting actions reaches a controlled multiple of the time for the variable controlled amount of time delay.

78. The method of claim 77, wherein the controlled multiple is selected from the range of between about 1 and 3.

79. The method of claim 77, wherein the controlled multiple is selected from the range of between about 1 and 2.

80. The method of claim 77, wherein the controlled multiple is about 1.5.

81. The method of claim 48, wherein at least one bid spotter acts as a bidder on behalf of a plurality of bidders, generating bid acceptance signals representing a desire to acquire the subject of the auction at a current bid by using the data input devices communicating over the network to the auction site and wherein if a bid spotter is the winning bidder, then the bidder on whose behalf the bid spotter made the winning bid is the bidder who receives the subject of the auction.

82. The method of claim 81, wherein at least one bid spotter and the plurality of bidders on whose behalf the bid spotter is bidding are located at the auction site.

83. The method of claim 81, wherein at least one bid spotter and die plurality of bidders on whose behalf the bid spotter is bidding are located in a remote location from the auction site.

84. The method of claim 83, wherein the remote location from the auction site is located in a different city than the auction site.

85. The method of claim 83, wherein the remote location from the auction site is located in a different building but in the same complex as the auction site.

86. The method of claim 83, wherein the remote location from the auction site is located in a different room but in the same building as the auction site.

87. The method of claim 81, wherein at least one of the plurality of bidders using data input devices is a bid spotter and at least one of the plurality of bidden using data input devices is a bidder acting on their own behalf.

88. The method of claim 81, wherein at least one of the plurality of bidders on whose behalf the bid spotter is acting as a bidder is also independently generating acceptance signals with a data input device.

89. A method for conducting an auction to produce a winning bidder who receives the subject of the auction in exchange for the winning bid, the auction having bidden, where a plurality of bidders have data input devices for communicating over a network to the auction site, comprising:
   generating an asking bid;
   displaying at the auction site in real-time, the asking bid;
   broadcasting in real-time over the network the asking bid to at least one of the plurality of bidders having data input devices;
   generating bid acceptance signals representing a desire to acquire the subject of the auction at a current bid by the bidden using the data input devices communicating over the network to the auction site;
   introducing a fixed programmed delay time period before accepting a first of a plurality of bid acceptance signals at the auction site;
   monitoring the network for bid acceptance signals;
   accepting a first bid acceptance signal after the programmed delay time period;
   identifying the bidder whose bid acceptance signal was accepted as the current bidder;
   changing the asking bid to the current bid;
   generating a second asking bid;
   displaying at the auction site in real-time, a second asking bid and the current bid;
   broadcasting in real-time over the network the second asking bid and the current bid to at least one of the plurality of bidders having data input devices;
   introducing a programmed delay time period before accepting a second of a plurality of bid acceptance signals at the auction site;
   monitoring the network for bid acceptance signals;
   accepting a first bid acceptance signal after the programmed delay time period;
   identifying the bidder whose bid acceptance signal was accepted as the new current bidder; and
   changing the second asking bid to the new current bid.

90. The method of claim 89, further comprising:
   repeating a cycle of generating, displaying, broadcasting, generating, introducing, monitoring, accepting, identifying, and changing, at least one additional cycle, each cycle starting with a new asking bid and ending with a new current bid which was the previous new asking bid and a new current bidder;
   terminating the acceptance of bid acceptance signals before a new bid acceptance signal is communicated over the network to the auction site;
   identifying the most recent current bid as the winning bid;
   identifying the most recent current bidder as the winning bidder; and
   closing the auction.

91. The method of claim 90, further comprising adjusting the programmed delay time period before accepting bid acceptance signals to a modified programmed delay time period, wherein the adjusting occurs after one delay time period and prior to the next delay time period during the auction.

92. The method of claim 91, wherein for at least one cycle during the auction after one delay time period and prior to the next delay time period, the programmed amount of time for delay before accepting bid acceptance signals remains the same.

93. The method of claim 89, wherein generating a second asking bid comprises generating a second asking bid by incrementing the current bid by a predetermined amount.

94. The method of claim 93, further comprising:
   repeating a cycle of generating, displaying, broadcasting, generating, introducing, monitoring, accepting, identifying, and changing each time starting with a new asking bid and ending with a new current bid which was the previous new asking bid and a new current bidder at least one additional cycle;
   generating an asking bid by incrementing the most recent current bid by a predetermined amount;
   displaying at the auction site in real-time, the most recent generated asking bid and the most recent current bid;
   broadcasting in real-time aver the network the most recently generated asking bid and the most recent current bid to at least one of the plurality of bidders having data input devices;
   delaying the most recent programmed delay time period before accepting bid acceptance signals;
   monitoring the network for bid acceptance signals;
   terminating the acceptance of bid acceptance signals before a new bid acceptance signal is communicated over the network to the auction site;
   identifying the most recent current bid as the winning bid;
   identifying the most recent current bidder as the winning bidder; and
   closing the auction.

95. The method of claim 94, further comprising adjusting the predetermined amount to increment the most recent current bid to a modified predetermined amount to increment the most recent current bid, wherein the adjusting occurs after one generation of an asking bid and prior to the next generation of an asking bid during the auction.

96. The method of claim 95, wherein for at least one cycle during the auction alter one generation of an asking bid and prior to the next generation of an asking bid the predetermined amount to increment the most recent current bid remains the same.

97. The method of claim 89, wherein generating of asking bids comprises generating asking bids in a plurality of currency valuations.

98. The method of claim 89, wherein the data input devices comprise telephones and monitoring the network includes sensing dual tone multi-frequency signals generated by the data input devices.

99. The method of claim 89, wherein broadcasting comprises broadcasting via television network.

100. The method of claim 99, wherein broadcasting via the television network comprises broadcasting via a satellite.

101. The method of claim 99, wherein broadcasting via the television network comprises broadcasting via a cable network.

102. The method of claim 99, wherein broadcasting via the television network comprises broadcasting via conventional television broadcasting.

103. The method of claim 89, wherein the network comprises:

a telephone network selected from the group consisting of a conventional telephone network, cellular network, satellite communications system, and the internet; and a video network selected from the group consisting of a satellite communications system, cable broadcast system, conventional television broadcast system, and the internet.

104. The method of claim 89, wherein the communication over the network comprises communication of data over the internet.

105. The method of claim 89, wherein displaying and broadcasting further comprise displaying and broadcasting information regarding the most recent current bidder.

106. The method of claim 105, wherein information regarding the most recent current bidder further comprises identifying the location of the most recent current bidder.

107. The method of claim 105, wherein information regarding the most recent current bidder comprises identification of the most recent current bidder.

108. The method of claim 89, wherein the auction site comprises the location of at least one computer participating in running the bidding system.

109. The method of claim 89, wherein the auction site comprises the location of the auctioneer.

110. The method of claim 89, wherein the auction site comprises the location of at least one computer participating in running the bidding system and the location of the auctioneer.

111. The method of claim 110, wherein the at least one computer participating in running the bidding system and the auctioneer are located in the same building.

112. The method of claim 110, wherein the at least one computer participating in running the bidding system and the auctioneer are located in the same complex.

113. The method of claim 110, wherein the auctioneer is located in a different building than the at least one computer participating in running the bidding system and hence wherein the auction site comprises more than one location.

114. The method of chum 89, wherein broadcasting in real-time over the network the asking bid to at least one of the plurality of bidders having data input devices comprises broadcasting in real-time over the network the asking bid to at least one of the plurality of bidders having data input devices located in a remote location from the auction site.

115. The method of claim 114, wherein at least one bidder receiving a broadcast while located in a remote location from the auction site is located in a different city than the auction site.

116. The method of claim 114, wherein at least one bidder receiving a broadcast while located in a remote location from the auction site is located in a different building but in the same complex as the auction site.

117. The method of claim 114, wherein at least one bidder receiving a broadcast while located in a remote location from the auction site is located in a different room but in the same building as the auction site.

118. The method of claim 114, wherein at least one bidder receiving a broadcast while located in a remote location from the auction site is located in the same hail as the auction site but is in a portion of the hall where the bidder is relying on the broadcast and a data input device to successfully participate in the auction.

119. The method of claim 89, wherein broadcasting in real-time over the network the asking bid to at least one of the plurality of bidders having data input devices comprises broadcasting in real-time over the network the asking bid to at least one of the plurality of bidders having data input devices located at the auction site.

120. The method of claim 89, wherein broadcasting in real-time over the network the asking bid to at least one of the plurality of bidders having data input devices comprises broadcasting in real-time over the network the asking bid to at least one of the plurality of bidders having data input devices located in a remote location from the auction site and to at least one of the plurality of bidders having data input devices located at the auction site.

121. The method of claim 89, wherein:
the programmed delay time period is a controlled amount selected from die range of between 0.2 and 3.5 seconds.

122. The method of claim 89, wherein:
the programmed delay time period is a controlled amount selected from the range of between 0.3 and 1.5 seconds.

123. The method of claim 89, wherein:
the programmed delay time period is a controlled amount selected from the range of between 0.5 and 1.0 seconds.

124. The method of claim 89, wherein at least one bid spotter acts as a bidder on behalf of a plurality of bidden, generating bid acceptance signals representing a desire to acquire the subject of the auction at a current bid by using the data input devices communicating over the network to the auction site and wherein if a bid spotter is the winning bidder, then the bidder on whose behalf the bid spotter made the winning bid is the bidder who receives the subject of the auction.

125. The method of claim 124, wherein at least one bid spotter and the plurality of bidders on whose behalf the bid spotter is bidding are located at the auction site.

126. The method of claim 124, wherein at least one bid spotter and the plurality of bidders on whose behalf the bid spotter is bidding are located in a remote location from the auction site.

127. The method of claim 126, wherein the remote location from the auction site is located in a different city than the auction site.

128. The method of claim 126, wherein the remote location from the auction site is located in a different building but in the same complex as the auction site.

129. The method of claim 126, wherein the remote location from the auction site is located in a different room but in the same building as the auction site.

130. The method of claim 124, wherein at least one of the plurality of bidders using data input devices is a bid spotter and at least one of the plurality of bidders using data input devices is a bidder acting on their own behalf.

131. The method of claim 124, wherein at least one of the plurality of bidders on whose behalf the bid spotter is acting as a bidder is also independently generating acceptance signals with a data input device.

132. A method for conducting an auction to produce a winning bidder who receives the subject of the auction in exchange for the winning bid, the auction having bidders, where a plurality of bidders have data input devices for communicating over a first network to the auction site and wherein information from the auction site is broadcast to at least one of the plurality of bidders having data input devices over a second network, comprising;

generating an asking bid;
displaying at the auction site in real-time, the asking bid;
broadcasting in real-time over the second network the asking bid to at least one of the plurality of bidders having data input devices;
generating bid acceptance signals representing a desire to acquire the subject of the auction at a current bid by the bidders using the data input devices communicating over the first network to the auction site;

beginning a bid acceptance time window in which to accept bid acceptance signals after delaying a controlled amount of time following accepting the prior asking bid;

monitoring the first network for bid acceptance signals;

accepting a flu-at bid acceptance signal after the bid acceptance time window begins;

terminating the bid acceptance time window after receiving the first bid acceptance signal and prior to receiving any subsequent bid acceptance signals;

identifying the bidder whose bid acceptance signal was accepted as the current bid;

changing the asking bid to the current bid;

repeating at least one additional cycle of generating, displaying, broadcasting, generating, beginning, monitoring, accepting, terminating, identifying, and changing, wherein each cycle starts with a new asking bid and ends with a new current bid which was the preceding new asking bid.

133. The method of claim 132, further comprising the following actions in a cycle after identifying the bidder whose bid acceptance signal was accepted as the current bid and before displaying or broadcasting the new asking bid in the next cycle:

generating a response communicating confirmation of bid acceptance and communicating the response over the first network to the bidder having the current bid; and generating a response communicating bid not accepted and communicating the response over the first network to each bidder who communicates a bid acceptance received after the bid acceptance time window terminated.

134. The method of claim 132, wherein the controlled amount of time to delay following broadcasting the asking bid and before opening the bid acceptance window is a variable controlled amount of time.

135. The method of claim 132, wherein the auction site comprises the location of at least one computer participating in running the bidding system.

136. The method of claim 132, wherein the auction site comprises the location of the auctioneer.

137. The method of claim 132, wherein the auction site comprises the location of at least one computer participating in running the bidding system and the location of the auctioneer.

138. The method of claim 137, wherein the at least one computer participating in running the bidding system and the auctioneer are located in the same building.

139. The method of claim 137, wherein the at least one computer participating in running the bidding system and the auctioneer are located in the same complex.

140. The method of claim 137, wherein the auctioneer is located in a different building than the at least one computer participating in running the bidding system and hence wherein the auction site comprises more than one location.

141. The method of claim 132, wherein broadcasting in real-time over the network the asking bid to at least one of the plurality of bidders having data input devices comprises broadcasting in real-time over the network the asking bid to at least one of the plurality of bidders having data input devices located in a remote location from the auction site.

142. The method of claim 141, wherein at least one bidder receiving a broadcast while located in a remote location from the auction site is located in a different city than the auction site.

143. The method of claim 141, wherein at least one bidder receiving a broadcast while located in a remote location from die auction site is located in a different building but in the same complex as the auction site.

144. The method of claim 141, wherein at least one bidder receiving a broadcast while located in a remote location from the auction site is located in a different room but in the same building as the auction site.

145. The method of claim 141, wherein at least one bidder receiving a broadcast while located in a remote location from the auction site is located in the same hail as the auction site but is in a portion of the hail where the bidder is relying on the broadcast and a data input device to successfully participate in the auction.

146. The method of claim 132, wherein broadcasting in real-time over the network the asking bid to at least one of the plurality of bidders having data input devices comprises broadcasting in real-time over the network the asking bid to at least one of the plurality of bidders having data input devices located, at the auction site.

147. The method of claim 132, wherein broadcasting in real-time over the network the asking bid to at least one of the plurality of bidders having data input devices comprises broadcasting in real-time over the network the asking bid to at least one of the plurality of bidders having data input devices located in a remote location from the auction site and to at least one of the plurality of bidders having data input devices located at the auction site.

148. The method of claim 132, wherein:
the controlled amount of time for delay following broadcasting the asking bid is a controlled amount selected from the range of between 0.2 and 3.5 seconds.

149. The method of claim 132, wherein:
the controlled amount of time for delay following broadcasting the asking bid is a controlled amount selected from the range of between 0.3 and 1.5 seconds.

150. The method of claim 132, wherein:
the controlled amount of time for delay following broadcasting the asking bid is a controlled amount selected from the range of between 0.5 mid 1.0 seconds.

151. The method of claim 132, wherein at least one bid spotter acts as a bidder on behalf of a plurality of bidders, generating bid acceptance signals representing a desire to acquire the subject of the auction at a current bid by using the data input devices communicating over the network to the auction site and wherein if a bid spotter is the winning bidder, then the bidder on whose behalf the bid spotter made the winning bid is the bidder who receives the subject of the auction.

152. The method of claim 151, wherein at least one bid spotter and the plurality of bidders on whose behalf the bid spotter is bidding are located at the auction site.

153. The method of claim 151, wherein at least one bid spotter and the plurality of bidders on whose behalf the bid spotter is bidding are located in a remote location from the auction site.

154. The method of claim 153, wherein the remote location from the auction site is located in a different city than the auction site.

155. The method of claim 153, wherein the remote location from the auction site is located in a different building but in the same complex as the auction site.

156. The method of claim 153, wherein the remote location from the auction site is located in a different room but in the same building as the auction site.

157. The method of claim 151, wherein at least one of the plurality of bidders using data input devices is a bid spotter and at least one of the plurality of bidders using data input devices is a bidder acting on their own behalf.

158. The method of claim 151, wherein at least one of the plurality of bidders on whose behalf die bid spotter is acting as a bidder is also independently generating acceptance signals with a data input device.

159. The method of claim 89, wherein the fixed programmed delay time period before accepting a first of a plurality of bid acceptance signals at die auction site is introduced after acceptance of the prior bid.

160. The method of claim 159, wherein the fixed programmed delay time period before accepting a first of a plurality of bid acceptance signals at the auction site is introduced after generating an asking bid.

161. The method of claim 159, wherein the fixed programmed delay time period before accepting a first of a plurality of bid acceptance signals at die auction site is introduced after broadcasting in real-time over the network the asking bid.

162. The method of claim 132, wherein the bid acceptance time window is begun after delaying a controlled amount of time following generating the asking bid.

163. The method of claim 162, wherein the bid acceptance time window is begun after delaying a controlled amount of time following broadcasting the asking bid.

* * * * *

UNITED STATES PATENT AND TRADEMARK OFFICE
CERTIFICATE OF CORRECTION

PATENT NO. : 7,076,460 B2
APPLICATION NO. : 10/005808
DATED : July 11, 2006
INVENTOR(S) : David L. Dinwoodie It is certified that error appears in the above-identified patent and that said Letters Patent is hereby corrected as shown below:

Col. 21, line 37, replace "aver" with -- over --
Col. 23, line 29, replace "225" with -- 2.25 --
Col. 26, line 21, replace "aver" with -- over --
Col. 26, line 27, replace "mast" with -- most --
Col. 26, line 30, replace "hid said" with -- bid and --
Col. 26, line 44, replace "aver" with -- over --
Col. 27, line 10, replace "meted" with -- method --
Col. 27, line 45, replace "hail" with -- hall --
Col. 27, line 46, replace "hail" with -- hall --
Col. 28, line 59, replace "die" with -- the --
Col. 29, line 14, replace "bidden" with -- bidders --
Col. 29, line 25, replace "bidden" with -- bidders --
Col. 30, line 23, replace "aver" with -- over --
Col. 30, line 45, replace "alter" with -- after --
Col. 31, line 40, replace "chum" with -- claim --
Col. 31, line 60, replace "hail" with -- hall --
Col. 32, line 13, replace "die" with -- the --
Col. 32, line 21, replace "bidden" with -- bidders --
Col. 33, line 8, replace "flu-at" with -- first --
Col. 34, line 3, replace "die" with -- the --
Col. 34, line 12, replace "hail" with -- hall --
Col. 35, line 4, replace "die" with -- the --
Col. 35, line 9, replace "die" with -- the --
Col. 36, line 3, replace "die" with -- the --

Signed and Sealed this

Fourteenth Day of November, 2006

JON W. DUDAS
*Director of the United States Patent and Trademark Office*